(12) United States Patent
Hayashi et al.

(10) Patent No.: US 11,638,877 B2
(45) Date of Patent: May 2, 2023

(54) NON-TRANSITORY COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD FOR PLAYING A GAME HAVING A PREDETERMINED ELEMENT SELECTED THEREIN

(71) Applicant: NINTENDO CO., LTD., Kyoto (JP)

(72) Inventors: Yugo Hayashi, Kyoto (JP); Ryosuke Ogata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/346,557

(22) Filed: Jun. 14, 2021

(65) Prior Publication Data
US 2022/0297011 A1 Sep. 22, 2022

(30) Foreign Application Priority Data
Mar. 19, 2021 (JP) .............................. JP2021-046320

(51) Int. Cl.
*A63F 13/67* (2014.01)
*A63F 13/537* (2014.01)

(52) U.S. Cl.
CPC ............ *A63F 13/67* (2014.09); *A63F 13/537* (2014.09)

(58) Field of Classification Search
CPC ............................... A63F 13/67; A63F 13/537
See application file for complete search history.

(56) References Cited

U.S. PATENT DOCUMENTS 11,383,171 B1 * 7/2022 Stoyanov ............. G06Q 10/087
2004/0254009 A1 * 12/2004 D'Amico ................ G07F 17/32
463/25

(Continued)

FOREIGN PATENT DOCUMENTS

| JP | 2017-055996 | 3/2017 |
| JP | 2019-063597 | 4/2019 |
| JP | 2020-116040 | 8/2020 |

OTHER PUBLICATIONS

Japanese Office Action dated Jan. 10, 2023 for the corresponding Japanese Application No. 2021-046320 (with translation), 11 pages.

(Continued)

*Primary Examiner* — Steve Rowland
(74) *Attorney, Agent, or Firm* — Nixon & Vanderhye, PC

(57) ABSTRACT

When a first input is performed in a predetermined scene, options including elements available in a predetermined game are presented. An element to be used in the predetermined game is determined on the basis of an operation input by a user. In response to a second input, the predetermined game using the determined element is executed. Meanwhile, at a predetermined timing before the predetermined game is started, an element to be used in the predetermined game is automatically determined. When a third input is performed in the predetermined scene, the predetermined game is executed using the automatically determined element. After the predetermined game is ended, a first reward is given to the user if the element used in the predetermined game is the element determined on the basis of the operation input by the user, and a second reward is given if the element is the automatically determined element.

17 Claims, 16 Drawing Sheets

(56) References Cited

U.S. PATENT DOCUMENTS

| | | | |
|---|---|---|---|
| 2007/0060226 A1* | 3/2007 | Sakaguchi | A63F 13/822 463/1 |
| 2012/0238365 A1* | 9/2012 | Gaiba | A63F 13/98 463/32 |
| 2014/0106876 A1* | 4/2014 | Knutsson | A63F 13/573 463/31 |
| 2017/0106278 A1* | 4/2017 | Ishizawa | A63F 13/33 |
| 2019/0287340 A1* | 9/2019 | Oberberger | G07F 17/3244 |
| 2020/0105104 A1* | 4/2020 | Rath | G07F 17/34 |
| 2020/0179795 A1* | 6/2020 | Patterson | A63F 9/18 |
| 2020/0230496 A1 | 7/2020 | Hayashi et al. | |
| 2021/0038993 A1* | 2/2021 | Nakahara | A63F 13/335 |

OTHER PUBLICATIONS

Pokken Tournament DX/Review (Nintendo Switch), YouTube [online][video] dated Sep. 18, 2017, https://www.youtube.com/watch?v=ym-qTeSNY-A & t =328 s.

Pokken DX Playing Diary 6 "Daily Challenge" Chinese [online] dated Oct. 5, 2017,http://switch -game.blog.jp/archives/4107183.html.

Pokken Tournament DX, Nintendo Switch All Catalog Mar. 3, 2017-Jan. 19, 2018, Ambit Co., Ltd dated Feb. 1, 2018 (p. 51).

Pokken Tournament DX, Serebii [online] Jan. 26, 2021, http://web.archive.org/web/20210126002227/https:/www.serebii.net/pokkendx/modes.shtml.

A game which is hard to become a Pay to Win, a Hatena blog [online] dated Nov. 20, 2019, https://uzuky.hatenablog.com/entry/20191120/1574188119.

* cited by examiner

NON-TRANSITORY COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD FOR PLAYING A GAME HAVING A PREDETERMINED ELEMENT SELECTED THEREIN

CROSS REFERENCE TO RELATED APPLICATION

This application claims priority to Japanese Patent Application No. 2021-046320 filed on Mar. 19, 2021, the entire contents of which are incorporated herein by reference.

FIELD

The exemplary embodiments relate to an information process for executing an application including a predetermined game, and in particular, relate to a process that requires selection of a predetermined element to be used in a game at the time of starting the game.

BACKGROUND AND SUMMARY

Conventionally, there has been known a game application that enables play of a racing game in which a character controlled in accordance with a user's input participates. In such a game application, a screen for selecting a character, a vehicle, and the like to be used in a racing game is displayed in a sequential flow from the start of the application until a predetermined racing game is started, whereby the user is required to perform operation of selecting a character and the like.

In a predetermined game such as the above racing game in which a user is required to select an element to be used in the game at the time of starting the game, there is room for improvement to increase motivation for playing the predetermined game.

Therefore, an object of the exemplary embodiments is to provide a non-transitory computer-readable storage medium having an information processing program stored therein, an information processing system, an information processing apparatus, and an information processing method that enable a user to more readily play such a game that requires the user to select a predetermined element to be used in the game at the time of starting the game.

Configuration examples for achieving the above objects will be shown below.

One configuration example is a non-transitory computer-readable storage medium having stored therein instructions that, when executed by a processor of an information processing apparatus, cause the information processing apparatus to perform operations comprising: executing an application including a predetermined game; displaying options including elements usable in the predetermined game, when a first input is performed by a user in a predetermined scene of the application; determining an element to be used in the predetermined game, from among the elements included in the options, on the basis of an operation input by the user; executing the predetermined game using the element determined on the basis of the operation input by the user, in response to a second input by the user; automatically determining an element to be used in the predetermined game, at a predetermined timing before the predetermined game is started; executing the predetermined game using the automatically determined element, when a third input is performed by the user in the predetermined scene of the application; and if the element used in the predetermined game is the element determined on the basis of the operation input by the user, giving a first reward to the user after the predetermined game is ended, and if the element used in the predetermined game is the automatically determined element, giving at least a second reward different from the first reward to the user after the predetermined game is ended.

According to the above configuration example, a game that requires selection of a predetermined element to be used in the game at the time of starting the game can be executed when a user has performed the third input in the predetermined scene. Thus, it is possible to start the game through a simpler operation than in a case of executing a predetermined game by the second input, whereby the user can be provided with a motivation to more readily play the game.

In another configuration example, the elements may be classified into a plurality of types at least including a first type element and a second type element. Then, an image of the options for each type of the elements may be displayed, the element to be used in the predetermined game may be determined for each type of the elements on the basis of the operation input by the user, and the element to be used in the predetermined game may be automatically determined for each type of the elements.

According to the above configuration example, even in a case where there are a plurality of elements to be selected for use in a game before the game is started, it is possible to start the game without an operation for the selection. This lowers the hurdle for starting the game, and thus can provide a motivation to play such a game.

In still another configuration example, the elements may include at least one of a stage to be used in the predetermined game, a character to be used in the predetermined game, an equipment item to be used in the predetermined game, or a difficulty level to be used in the predetermined game.

According to the above configuration example, even in a case where there are a plurality of elements to be selected for use in a game before the game is started, it is possible to start the game without an operation for the selection. This lowers the hurdle for starting the game, and thus can provide a motivation to play such a game.

In still another configuration example, if the element determined from the first type elements and the element determined from the second type elements satisfy a predetermined combination condition, an effect advantageous to the user may be generated during the execution of the predetermined game, and in automatically determining the elements respectively from the first type elements and the second type elements, the respective elements may be determined so as to satisfy the predetermined combination condition.

According to the above configuration example, in a case of playing the game with the element automatically determined, the user can play the game using a combination of the elements advantageous to the game. Thus, it is possible to increase amusement of the game in a case of playing the game with the element automatically determined.

In still another configuration example, if the element determined from the first type elements and the element determined from the second type elements satisfy a predetermined combination condition, an effect that the first reward or the second reward becomes more likely to be obtained than in a case of not satisfying the predetermined combination condition, may be generated, and in automatically determining the elements respectively from the first type elements and the second type elements, the respective elements may be determined so as to satisfy the predetermined combination condition.

According to the above configuration example, it is possible to increase amusement of the game in a case of playing the game with the element automatically determined.

In still another configuration example, the instructions may further cause the information processing apparatus to perform operations comprising: displaying a UI image indicating at least one of the automatically determined elements, in the predetermined scene of the application; and automatically determining at least one of the elements to be used in the predetermined game, before displaying the UI image.

According to the above configuration example, in a case of playing the game with the element automatically determined, it is possible to know the element that the user will use in the game, before starting the game. Thus, convenience for the user can be enhanced.

In still another configuration example, in the automatic determination of the element, the element for which a number of times of usage is small may be preferentially determined as the element to be used in the predetermined game.

According to the above configuration example, in a case of playing the game with the element automatically determined, it is possible to make the user play the game in which the element that the user has not tried or experienced yet or has tried or experienced a fewer number of times is preferentially selected. Thus, the user can be provided with a new game experience, and the possibility of letting the user make a new discovery can be increased even if the game content is the same as in the past play.

In still another configuration example, the element may be a difficulty level to be set for the predetermined game, and in the automatic determination of the element, the difficulty level selected on the basis of a play history of the user may be determined as the element to be used in the predetermined game.

According to the above configuration example, in a case of playing the game with the element automatically determined, it is possible to provide the game adapted to the game skill of the user at that time. Thus, amusement of the game can be increased.

In still another configuration example, the instructions may further cause the information processing apparatus to, in accordance with satisfaction of a predetermined acquisition condition in the predetermined game, give, to the user, an element corresponding to the satisfied condition among all the elements to be used in the predetermined game. Further, the displayed options may be first options including the element given to the user, and the element to be used in the predetermined game may be determined from among the first options, on the basis of the operation input by the user. In the automatic determination of the element, the element to be used in the predetermined game may be determined from among second options which include, in addition to the element given to the user, an element that has not been given to the user yet.

According to the above configuration example, in a case of playing the game with the element automatically determined, it is possible to provide an occasion in which the user can play the game with an element that is not possessed by the user. Thus, a new game experience can be provided.

In still another configuration example, a number of times the second reward is given in a predetermined period may be limited.

According to the above configuration example, for example, the occasion of allowing the user to acquire the second reward during one day can be limited, whereby the user can be provided with a motivation to continue to play the game in which the element is automatically determined, for a plurality of days.

In still another configuration example, after the predetermined game using the automatically determined element is executed a predetermined number of times in a predetermined period, execution of the predetermined game using the automatically determined element may be restricted.

According to the above configuration example, the number of times the game in which the element is automatically determined can be played can be limited to, for example, once per day. Owing to such a limitation that the game can be played only once per day, for example, the user's motivation to play the game can be maintained, and the user can be tempted to play the game.

In still another configuration example, the restriction of execution of the predetermined game using the automatically determined element may be canceled every time the predetermined period elapses.

According to the above configuration example, the game is allowed to be played again when the date has changed, for example. Thus, the player can be provided with a motivation to continue to play the game.

In still another configuration example, the first reward may be given to the user, in both of a case where the element used in the predetermined game is the element determined on the basis of the operation input by the user, and a case where the element used in the predetermined game is the automatically determined element.

In still another configuration example, an amount of the first reward may be changed in accordance with a result of the predetermined game.

According to the above configuration example, the amount of the first reward can be changed in accordance with the user's skill, and thus amusement of the game is not lost.

In still another configuration example, a number of times of operations for starting the predetermined game from when the game application is started until the predetermined game is started by the third input may be smaller than a number of times of operations for starting the predetermined game from when the game application is started until the predetermined game is started by the second input.

According to the above configuration example, it is possible to provide such an environment that allows the game to be readily started. Thus, the hurdle for starting the game is lowered, whereby such an environment that allows the user to readily play the game can be provided.

In still another configuration example, in response to the third input that is a single input, the elements to be used in the predetermined game may be automatically determined for each of the plurality of types of the elements.

According to the above configuration example, with only one operation, the element is automatically selected and the game can be started. Therefore, a labor for the user to select the element when starting the game can be eliminated. Thus, the game can be more readily started and a motivation for the user to play the game can be increased.

In still another configuration example, in response to the third input performed once by the user, the predetermined game using the automatically determined element may be executed.

According to the above configuration example, with only a single third input operation, the element is automatically selected and the game can be started. Therefore, a labor for the user to select the element when starting the game can be eliminated.

According to the exemplary embodiments, it is possible to provide a motivation for a user to play such a game that requires the user to select a predetermined element to be used in the game at the time of starting the game.

DETAILED DESCRIPTION OF NON-LIMITING EXAMPLE EMBODIMENTS

Figure 1:
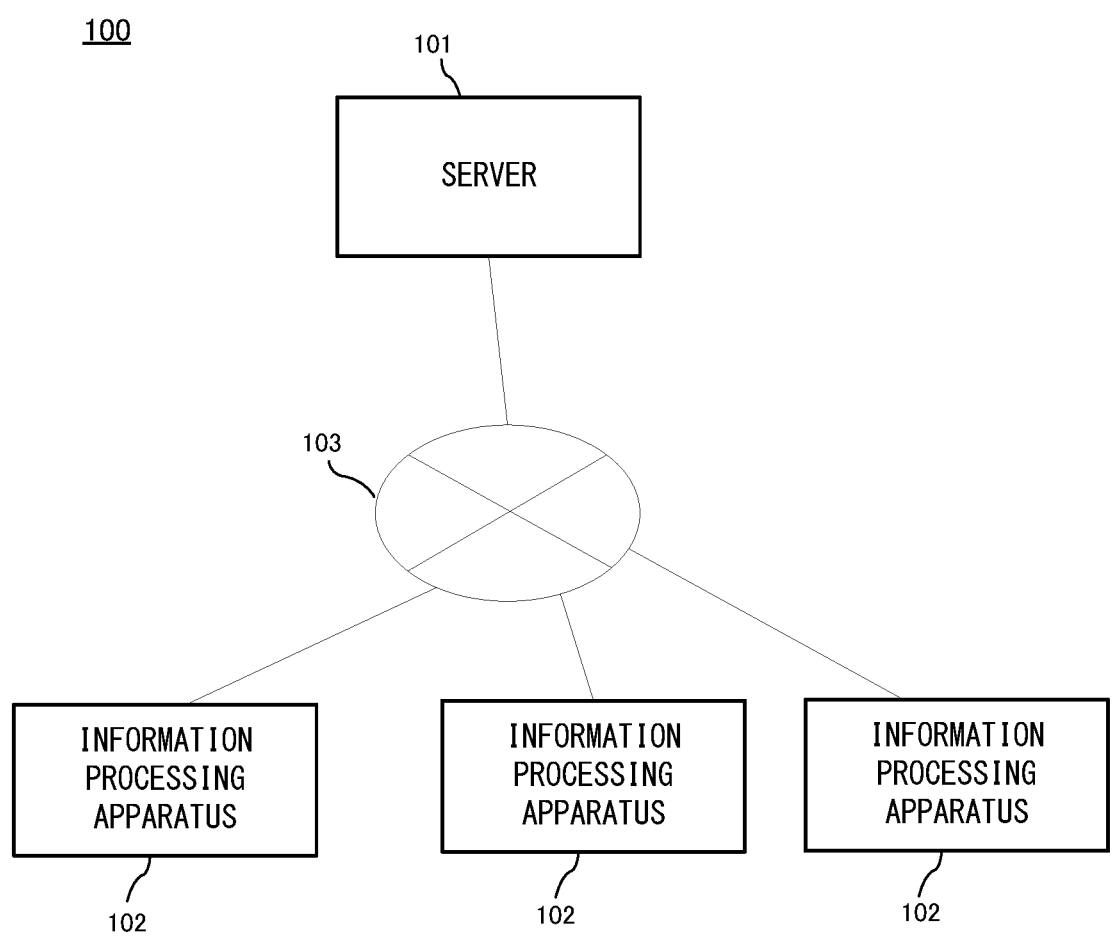
FIG. 1 is a schematic diagram showing a non-limiting example of the entire configuration of an information processing system according to one exemplary embodiment.

Hereinafter, one exemplary embodiment will be described. FIG. 1 is a schematic diagram showing an overall image of an information processing system according to the exemplary embodiment. An information processing system 100 of the exemplary embodiment includes a server 101 and a plurality of information processing apparatuses 102. In the exemplary embodiment, a hand-held information processing apparatus is assumed as an example of the information processing apparatus 102. More specifically, in the exemplary embodiment, a hand-held information processing apparatus such as a smartphone or a tablet apparatus is assumed as the information processing apparatus 102. However, the processing of the exemplary embodiment can be also applied to stationary game apparatuses. The server 101 and the information processing apparatuses 102 are configured so as to be communicable with each other via the internet 103.

In the exemplary embodiment, information processing is executed under the configuration as described above. In the following, as an example of the information processing, game processing is described as an example. Specifically, a game application (hereinafter, simply referred to as application) is installed in each information processing apparatus 102, and the game processing is executed while the information processing apparatus 102 communicates with the server 101 as appropriate. In the game processing according to the exemplary embodiment, the data itself indicating the play status of a player is stored in the server 101. The data indicating the play status is, for example, data indicating the progress of the game, characters and items possessed by the user, and the like. In the exemplary embodiment, a process of logging in to the server 101 is executed at the start of the application, saved data indicating the play status of the user is obtained from the server 101 onto the information processing apparatus 102, and the game processing is executed by using the data.

[Hardware Configuration of Information Processing Apparatus]

Figure 2:
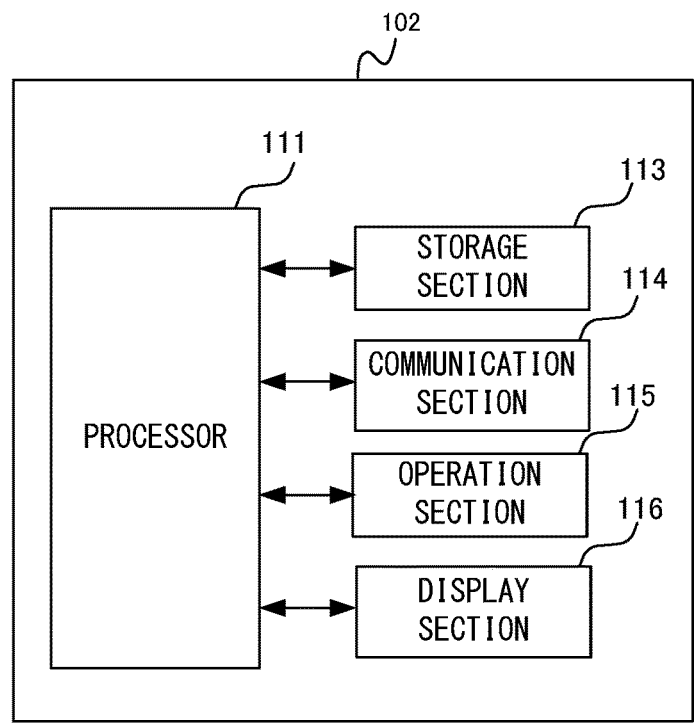
FIG. 2 is a block diagram showing a non-limiting example of the configuration of an information processing apparatus 102.

Next, the configuration of the information processing apparatus 102 will be described. FIG. 2 is a functional block diagram of the information processing apparatus 102. In FIG. 2, the information processing apparatus 102 includes a processor 111, a storage section 113, a communication section 114, an operation section 115, and a display section 116. The processor 111 controls operation of the information processing apparatus 102 by executing information processing described later, or by executing a system program (not shown) for controlling overall operation of the information processing apparatus 102. The processor 111 may include a single processor or a plurality of processors. Various kinds of programs to be executed by the processor 111 and various kinds of data to be used in the programs are stored in the storage section 113. The storage section 113 is, for example, a flash EEPROM or a hard disk device. The communication section 114 is connected to a network through wired or wireless communication, and transmits/receives predetermined data to/from the server 101. The operation section 115 is, for example, an input device for receiving an operation from a user. The display section 116 is typically a liquid crystal display device. In the processing according to the exemplary embodiment, a touch panel integrated with a liquid crystal screen is assumed as the operation section 115 and the display section 116. In another exemplary embodiment, a predetermined pointing device other than a touch panel may be used as the operation section 115.

[Configuration of Server]

Figure 3:
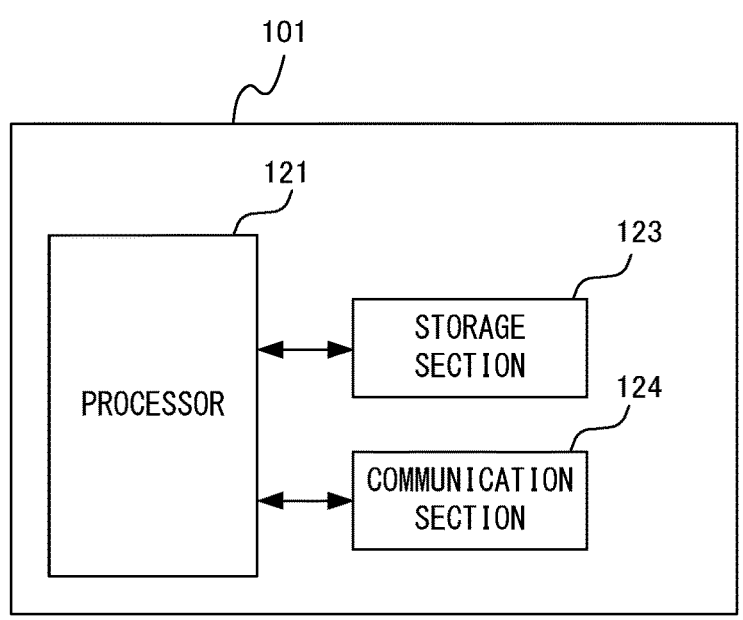
FIG. 3 is a block diagram showing a non-limiting example of the configuration of a server 101.

Next, the configuration of the server 101 will be described. FIG. 3 is a functional block diagram of the server 101. The server 101 includes at least a processor 121, a storage section 123, and a communication section 124. The processor 121 executes various kinds of programs for controlling the server 101. Various kinds of programs to be executed and various kinds of data to be used by the processor 121 are stored in the storage section 123. The communication section 124 is connected to a network through wired or wireless communication, and transmits/receives predetermined data to/from the information processing apparatuses 102 or another server (not shown).

[Outline of Process According to the Exemplary Embodiment]

Next, the outline of an application process executed in the exemplary embodiment will be described. In an application executed in the exemplary embodiment, a racing game for traveling in a virtual 3-dimensional space can be played. In the racing game, basically, a user can select elements to be used in the racing game at the time of starting a race. Examples of the elements include a stage (also called a course) for traveling, a character (playing a role of a driver) to be used in a race, a machine to be used (a vehicle used in a race), and an equipment item to be used (an item mounted to the machine). In the following description, the stage, the character, the machine, and the equipment item used in the racing game as described above may be collectively referred to as "race elements".

After an operation of selecting race elements as described above is finished, the user performs an operation for starting a race and thus the racing game is started. The exemplary embodiment relates to processing for quickly starting a racing game by automatically selecting race elements in such a game that includes an operation of selecting race elements at the time of starting the racing game. In the following description, a race started by the user selecting the race elements is referred to as "normal race", and a race that can be started by the race elements being automatically selected is referred to as "quick race". In the exemplary embodiment, a reward can be given to the user after the racing game is finished, and the reward differs between the above two types of races.

Here, supplementary description will be given regarding the character, the machine, and the equipment item. In the application according to the exemplary embodiment, a plurality of types are prepared for each of the machine, the character, and the equipment item. In the exemplary embodiment, as an example, it is assumed that fifty types of machines, fifty types of characters, and one-hundred types of equipment items are prepared. However, the user cannot use all of these from the beginning, and some of them are given to the user when a predetermined condition is satisfied in the application. For example, when the application according to the exemplary embodiment is newly started, one predetermined character, one predetermined machine, and one predetermined equipment item are given to the user. Thereafter, for example, if the user wins first place in races five times, the user can acquire a character A, and when the user wins first place ten times, the user can acquire a character B. Thus, when a predetermined giving condition is satisfied, a predetermined character is given to the user. Besides, when predetermined lottery processing is performed in the application, a character, a machine, or an equipment item selected by the lottery can be given. Therefore, the characters, the machines, and the equipment items possessed by each user may differ from those of other users. At the time of starting the normal race, the characters, the machines, and the equipment items given to the user as described above are presented to the user as options for race elements to be used in the race.

In the exemplary embodiment, a plurality of types are prepared also for the stage, and in the following description, it is assumed that twelve stages are prepared as an example. It is noted that, in the exemplary embodiment, it is assumed that all of these stages can be used from the beginning of the game. In another exemplary embodiment, it may be assumed that only one stage is allowed to be played at the beginning, and then, for example, while a predetermined achievement condition is achieved in each stage, the number of available stages gradually increases in accordance with progress of the game. Further, a stage available for the user may be added when a predetermined time (e.g., 24 hours) passes, or stages available for the user may be replaced at least partially every predetermined time (e.g., every two weeks).

Figure 4:
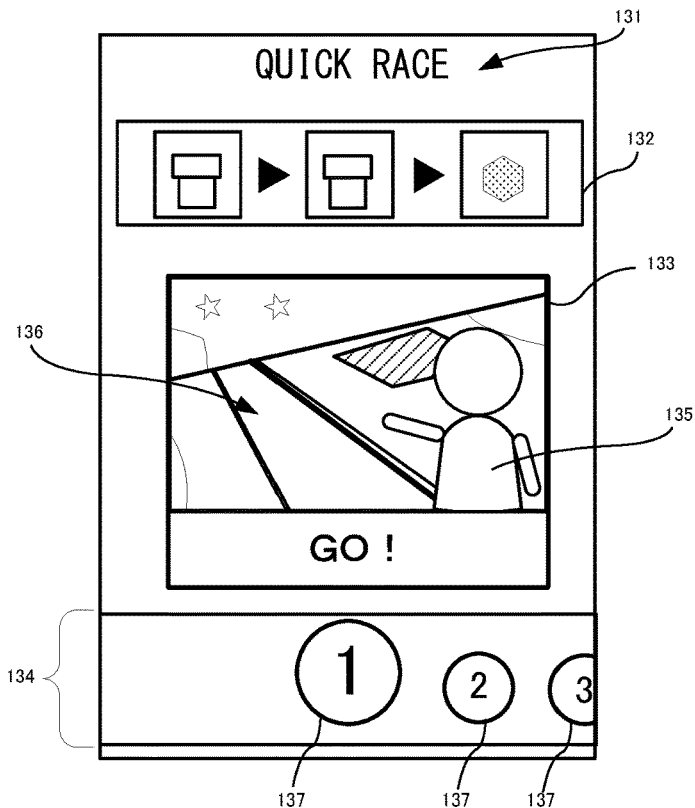
FIG. 4 shows a non-limiting example of a screen of a game in the exemplary embodiment.

Next, using a screen example, the flow of the application process according to the exemplary embodiment, an operation example, and a screen shift example will be described. FIG. 4 shows an example of a predetermined scene that appears after the application is started, and shows a "home screen" displayed after the user has started the application and before the racing game is started. In the home screen in FIG. 4, a predetermined image is displayed. In the exemplary embodiment, an image relevant to the quick race is displayed as an example of the predetermined image. Hereinafter, this image is referred to as "quick race relevant image". The quick race relevant image is an image for mainly presenting information about the quick race to the user. The quick race relevant image includes a race name 131, a reward information area 132, a thumbnail image 133, and a page icon area 134. The race name 131 indicates the name of the race displayed at present, and is displayed as a name "QUICK RACE" in FIG. 4. The reward information area 132 is an area indicating information about a reward that can be acquired by playing the quick race and finishing the whole course thereof. The thumbnail image 133 presents, to the user, images of a stage and a character to be used in the quick race, i.e., the stage and the character automatically selected as described above. In addition, the quick race can be started by tapping the thumbnail image 133. The reward and the thumbnail image 133 will be described later in detail.

Figure 5:
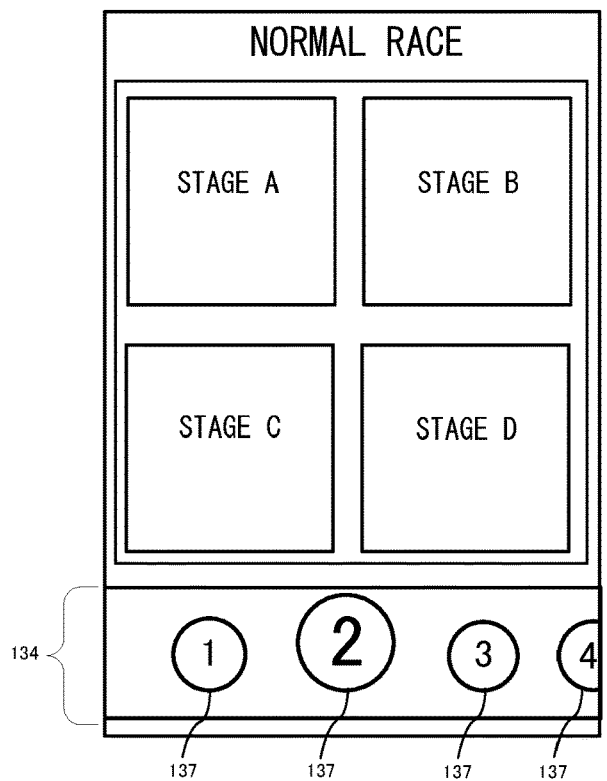
FIG. 5 shows a non-limiting example of a screen of the game in the exemplary embodiment.

A plurality of page icons 137 are displayed in the page icon area 134 displayed at a lower part of the home screen. The user can change the displayed content by performing a predetermined operation on the page icon area 134. For example, in the state shown in FIG. 4, if the user performs a swipe operation from right to left in the page icon area 134, a screen as shown in FIG. 5 is displayed. In FIG. 5, a "normal race relevant image" which is an image relevant to the normal race is displayed. In the normal race relevant image in FIG. 5, stage images indicating four stages, i.e., stages A to D, are shown. Although stage names are shown in FIG. 5, images that allow the user to imagine the contents of the stages may be displayed, for example. In addition, these four stage images serve also as options (hereinafter, may be referred to as stage options) for allowing the user to select a stage. That is, these four stage images can be said to be images for selecting an element to be used in the normal race. Hereinafter, images having such a role may be collectively referred to as "option images".

In the state shown in FIG. 5, if the user performs a swipe operation further leftward on the page icon area 134, a normal race relevant image including stage options for other stages is displayed (not shown). On the other hand, in the state shown in FIG. 5, if the user performs a swipe operation rightward, the quick race relevant image shown in FIG. 4 is displayed.

Figure 6:
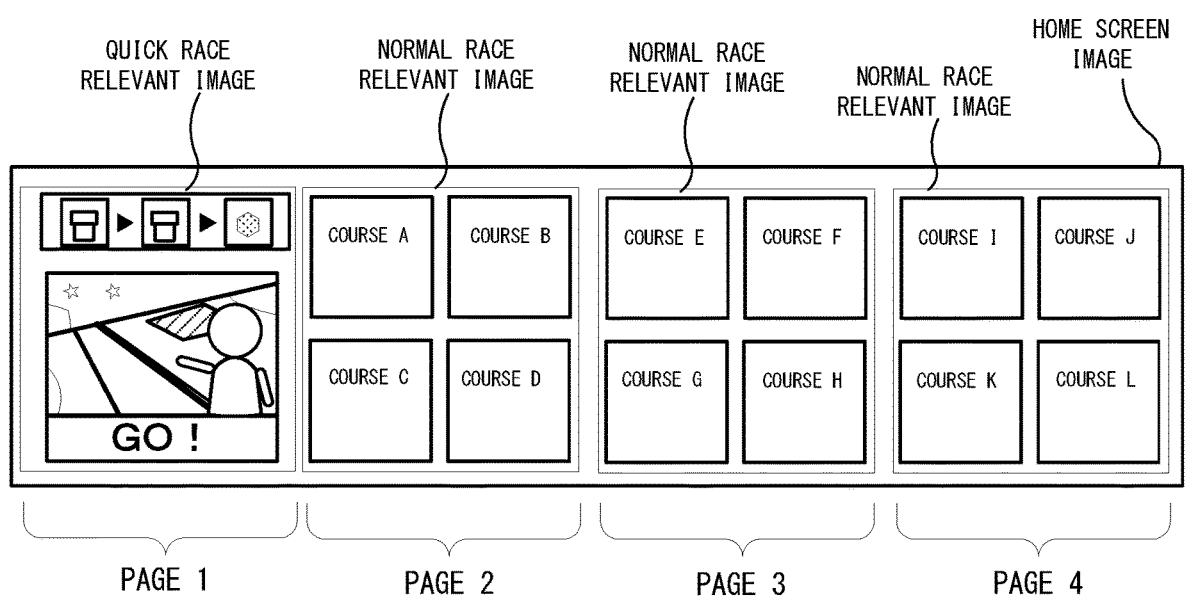
FIG. 6 is a non-limiting example diagram illustrating the outline of a home screen.

FIG. 6 is a schematic diagram showing the configuration of the home screen in the exemplary embodiment. In the exemplary embodiment, as an image of the home screen, a home screen image having a horizontally long rectangular shape is generated. A unit area having a length of one screen in the horizontal direction is referred to as "page", and the home screen image is configured to have areas for four pages. The quick race relevant image is located at the leftmost side (the start position in scrolling), and three normal race relevant images are arranged adjacently in the rightward direction. The user can switch the displayed content on a page basis through a swipe operation in the left-right direction on the page icon area 134. The above page icons 137 are also said to be icons corresponding to the respective pages. In the example shown in FIG. 4 and FIG. 5, page numbers are indicated on the page icons 137, but in another exemplary embodiment, images that allow the user to imagine race contents that are to be displayed on the respective pages may be displayed as the page icons 137. In the exemplary embodiment, the operation for switching the page can be performed not only by the swipe operation but also by directly tapping each page icon 137.

As described later in detail, control can be performed so that the quick race relevant image is not included in the home screen image, after a predetermined condition is satisfied. In this case, the number of pages of the home screen is decreased from four to three. That is, the home screen can come into a state in which the quick race relevant image is not displayed.

Next, the details of the quick race and the normal race will be described. For convenience of description, the normal race will be described first, and then the quick race will be described.

[Normal Race]

As described above, the normal race is a racing game played using elements selected from the race elements by a user's operation. An operation example and a screen example until the normal race is actually started from the screen of the normal race relevant image shown in FIG. 5, will be described below. First, on the screen shown in FIG. 5, the user taps the image of one stage from among the presented stage options, as an example of a first input. Here, it is assumed that the user taps the image of the stage A. Thus, the stage to be used in the normal race is selected.

Figure 7:
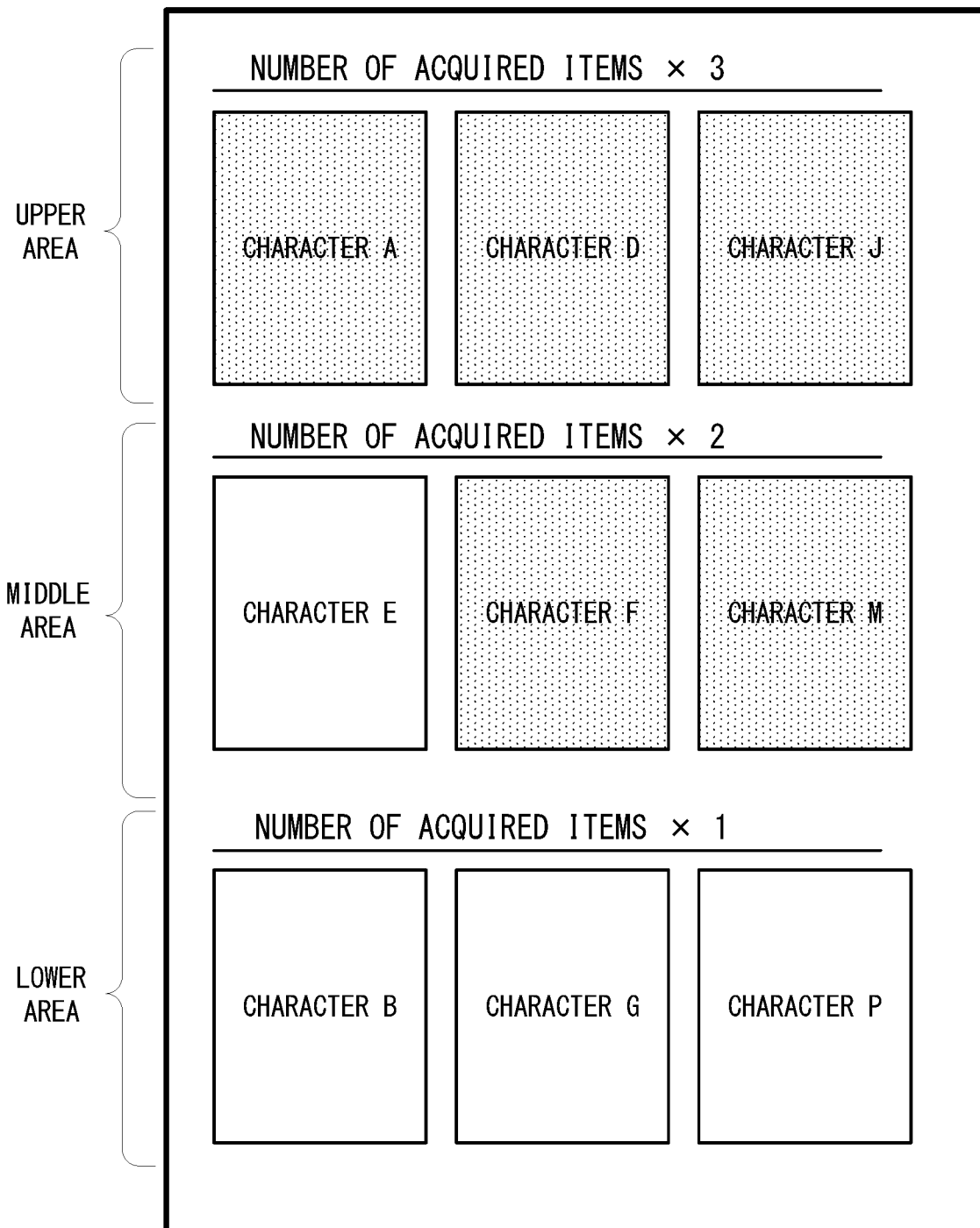
FIG. 7 shows a non-limiting example of a screen of the game in the exemplary embodiment.

After the stage is selected, a screen as shown in FIG. 7 is displayed. FIG. 7 shows a character selection screen for selecting a character to be used in the normal race. In FIG. 7, there are three areas arranged in the order of an upper area, a middle area, and a lower area along the vertical direction from the top of the screen, and three character images are displayed as options in each area. Each area can be scrolled in the left-right direction by a swipe operation. Through this operation, a character image not displayed on the screen at present can be displayed.

These areas are sorted in accordance with the degrees of "combination effects" generated when a predetermined combination condition is satisfied. Here, the "combination effect" will be described. In the racing game of the exemplary embodiment, combinations of characters, machines, and equipment items that can provide various advantageous effects during a race are defined for each stage. Specifically, as advantageous effects of characters, effects of "increasing the number of items that can be acquired when an item box is touched during a racing game" are defined, and more specifically, effects of increasing the number of acquired items 1-fold, 2-fold, and 3-fold are defined for each stage. That is, it can be said that, when the stage and the character satisfy a predetermined combination condition, an advantageous effect for the user is generated so that a reward can be more readily obtained. For machines, effects of increasing the number of acquired points given when a predetermined action is performed are defined. More specifically, effects of increasing the number of acquired points 1-fold, 1.5-fold, and 2-fold are defined for each stage. That is, it can be said that, when the stage and the machine satisfy a predetermined combination condition, an advantageous effect for the user is generated so that a reward can be more readily obtained. The "point" will be described later. For equipment items, effects that a condition for acknowledging a combo during a racing game is relaxed and the number of points that the user can acquire through the combo is increased, are defined. The combo is a concept that is acknowledged when the user has repeated a predetermined action within a certain period during a racing game, and the number of points given to the user increases as the combo continues. Here, when the course and the equipment item satisfy a predetermined combination condition, a limit time within which the combo is determined to be continued is extended so that the combo can be more readily continued, and the number of points that the user can acquire by continuing the combo is also increased. That is, it can be said that, when the stage and the equipment item satisfy a predetermined combination condition, an advantageous effect for the user is generated so that a reward can be more readily obtained. Here, when the course and equipment item satisfy a predetermined combination condition, a limit time within which the combo is acknowledged is increased stepwise, and the number of points that the user can additionally acquire by continuing the combo is defined as 1-fold, 2-fold, or 3-fold, for each stage.

With reference to the example shown in FIG. 7, in the upper area, character images for which an effect of "the number of acquired items×3" is defined in this stage are displayed. In the middle area, character images for which an effect of "the number of acquired items×2" is defined in this stage are displayed. In the lower area, character images for which an effect of "the number of acquired items×1" is defined in this stage are displayed.

On the character selection screen, all the characters sorted in accordance with the degrees of the combination effects can be displayed. That is, in the example shown in FIG. 7, characters corresponding to the number of acquired items×1, characters corresponding to the number of acquired items×2, characters corresponding to the number of acquired items×3, are sorted and displayed for the predetermined stage. Among these, the characters that are not possessed by the user are displayed in a grayed-out state. In the example shown in FIG. 7, the three characters displayed in the upper area are all grayed out so as to indicate that the user does not possess these characters. In the middle area, only one character that is not grayed out is displayed, and in the lower area, all of the three characters displayed at present are in a state of not being grayed out. That is, in the example shown in FIG. 7, it is indicated that the user does not possess even one character corresponding to "the number of acquired items× 3", and possesses only one character corresponding to "the number of acquired items×2". In addition, it is indicated that the user possesses at least three characters corresponding to "the number of acquired items×1". Therefore, the user is to select by tapping a character to be used in the race, from among the user's possessed characters, i.e., the character images that are not grayed out. In a case where a grayed-out image is tapped, an indication that the image cannot be selected or the like may be displayed.

Figure 8:
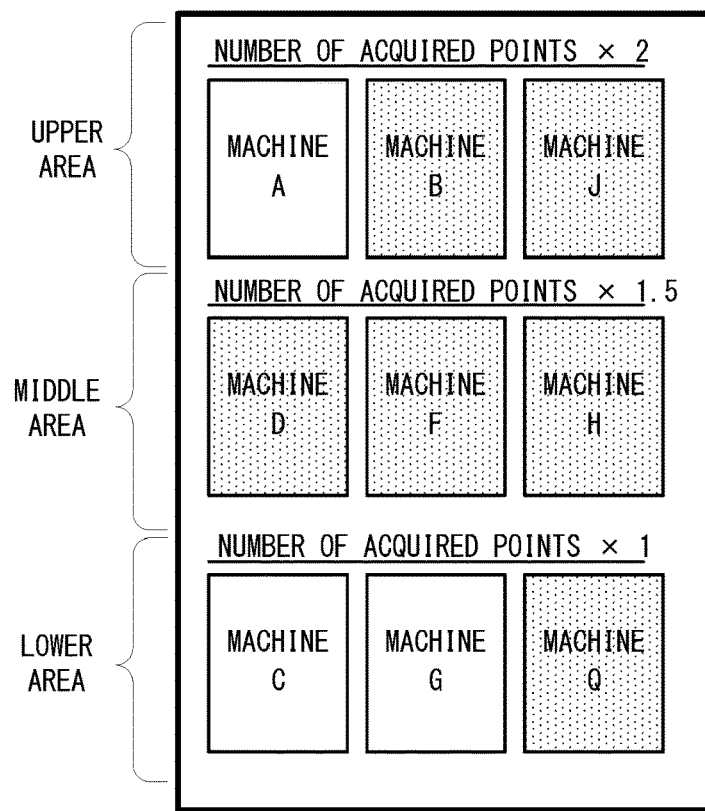
FIG. 8 shows a non-limiting example of a screen of the game in the exemplary embodiment.

On the character selection screen as described above, a character to be used by the user is selected as a used character on the basis of an operation input (e.g., tap operation) from the user. Next, a screen as shown in FIG. 8 is displayed. FIG. 8 shows a machine selection screen for selecting a machine to be used in the normal race. The content displayed on this screen is the same as in the case of the above character selection screen, except that the characters are replaced with machines and the combination effects are different. Therefore, the detailed description is omitted. In the example shown in FIG. 8, it is indicated that the user possesses one machine corresponding to "the number of acquired points×2", does not possess even one machine corresponding to "the number of acquired points× 1.5", and possesses two machines corresponding to "the number of acquired points×1".

Figure 9:
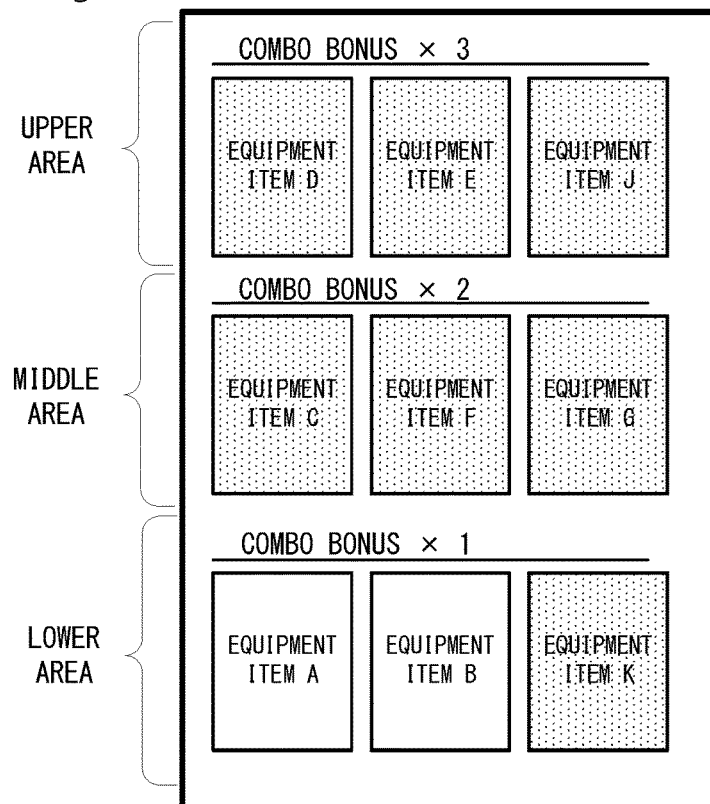
FIG. 9 shows a non-limiting example of a screen of the game in the exemplary embodiment.

Next, on the machine selection screen, when the user taps a machine to be used, the tapped machine is selected as a used machine, and then a screen as shown in FIG. 9 is displayed. FIG. 9 shows an equipment selection screen for selecting an equipment item to be used in the normal race. The content displayed on this screen is also the same as in the case of the above character selection screen, except that the characters are replaced with equipment items and the combination effects are different. Therefore, the detailed description is omitted. In the example shown in FIG. 9, it is indicated that the user does not possess even one equipment item corresponding to "the combo acknowledgement condition relaxed (level 3)+bonus points×3 when the combo is acknowledged" or "the combo acknowledgement condition relaxed (level 2)+bonus points×2 when the combo is acknowledged", and possesses two equipment items corresponding to "the combo acknowledgement condition relaxed (level 1)+bonus points×1 when the combo is acknowledged".

Figure 10:
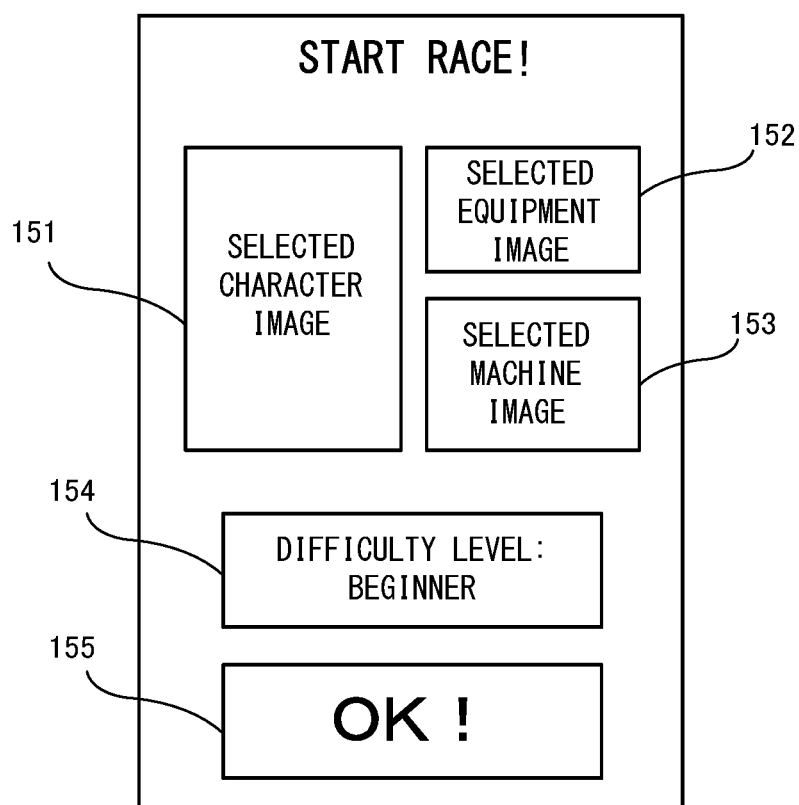
FIG. 10 shows a non-limiting example of a screen of the game in the exemplary embodiment.

On the above equipment selection screen, when the user taps an equipment item to be used, the tapped equipment item is selected as a used equipment item, and then a screen as shown in FIG. 10 is displayed. FIG. 10 shows a start confirmation screen for the normal race. On this screen, a selected character image 151 indicating the character selected by the above operation, a selected machine image 153 indicating the machine selected by the above operation, and a selected equipment image 152 indicating the equipment item selected by the above operation, are displayed. In addition, a difficulty information button 154 indicating the difficulty level of the racing game, and an OK button 155 for starting the normal race, are displayed. Here, in the racing game, the user can set the difficulty level of the game at a beginner level, a middle level, or an advanced level, for example. In other words, setting of the difficulty level can be said to be one type of the race element. On the screen shown in FIG. 10, when the user taps the difficulty information button 154, a difficulty selection screen (not shown) is displayed, and the user can select a desired difficulty level. At the difficulty information button 154, the difficulty level selected by the user is displayed. In addition, in a case where the same stage is played a plurality of times, the difficulty level selected in the previous play is set on the start confirmation screen and is displayed at the difficulty information button 154.

On the screen shown in FIG. 10, when the user performs a second input (in the exemplary embodiment, taps the OK button 155), the normal race is started. Although not shown, a racing game screen of 3D type is displayed and the racing game progresses on the basis of a user's operation. In the racing game, item boxes are placed as appropriate on the traveling course, and when any item box is touched, a predetermined item that can be used in the race can be acquired. The number of items that are acquired can vary in accordance with a combination of the stage and the character. Then, when the user has reached a goal, the racing game is finished. It is noted that it is also possible to retire by performing a predetermined operation during the race.

When the race is finished by the user reaching the goal, a race result screen is displayed and a reward in accordance with the race result is given to the user. In the exemplary embodiment, the race result includes, for example, the user's ranking, the number of times the user has performed a predetermined action, the number of times a combo was continued, and/or the acquired number of predetermined items (in the exemplary embodiment, coins) placed on the course. The above reward is given to the user also in the case of the quick race described later. Hereinafter, this reward is referred to as "common reward". A specific content of the common reward is, for example, a growth element that can raise the user's game rank (so-called an experience point element), in-game currency, or points needed for acquiring an item that can be used to be exchanged for a predetermined reward or can be used for unlocking a new course. However, the common reward is not limited thereto. In another exemplary embodiment, the common reward may be a character, a kart, or an equipment item, or may be an item needed for a lottery for giving such a thing. While the above points are given in accordance with a result of the race, in addition to this, a "basic distribution amount" given irrespective of the race result is defined in advance in accordance with the above predetermined combination condition. Therefore, the amount of given points can vary irrespective of the race result, in accordance with a combination of a character, a machine, or an equipment item with the stage as described above. For example, the basic distribution amount increases 2-fold by the combination effect. That is, in a case where the combination effect is satisfied, it can be said that an effect that a reward becomes more likely to be obtained is generated, as compared to other cases. When distribution of the reward is finished, the normal race is finished, thus shifting to the home screen.

[Quick Race]

Next, the details of the quick race will be described. In the exemplary embodiment, the quick race is a race that can be played only once on "the day". In the exemplary embodiment, "the day" is a unit period of 24 hours starting from a certain point of time and is a period to which the present date and time belong. For example, a period from 15:00:00 at a start point to 14:59:59 on the next day is defined as the unit time, and the present date and time are assumed to be 16:00:00 on April 1. In this case, "the day" refers to a period from 15:00:00 on April 1 to 14:59:59 on April 2. The quick race can be played only once during this unit period, in other words, can be played only once per day.

However, in a case where the user retires during the quick race, it is possible to play the quick race again on the day. That is, it is possible to start the quick race as many times as desired, until reaching the goal and finishing the quick race (in other words, until running the full course of the quick race).

In a case where the user has reached the goal and finished the quick race, an image (hereinafter, referred to as waiting time image) indicating "the remaining time until it becomes possible to play the next quick race" is displayed, instead of the thumbnail image 133 shown in FIG. 4, in the quick race relevant image, during the period of the day. Then, when the present unit period (the day) has ended and the next unit period starts, the waiting time image disappears, and the thumbnail image 133 for the quick race on the day is displayed. In another exemplary embodiment, in a case where the user has reached the goal and finished the quick race, control may be performed so that neither the thumbnail image 133 nor the waiting time image is displayed, i.e., the quick race relevant image itself is not displayed, during the period of the day.

Here, on the home screen, the quick race relevant image is controlled to be displayed in the top page. Therefore, in the scene where the home screen is initially displayed after operation is performed to start the application, the quick race relevant image can be initially presented to the user. Thus, the user can start the quick race with one tap after performing an operation of starting the application.

Next, the aforementioned automatic selection of race elements for the quick race will be described. As described above, for the quick race, race elements such as a stage, a character, a machine, and an equipment item are automatically selected irrespective of a user's operation. One example of a method for selecting the elements will be described. First, regarding the stage, a stage for a quick race is selected at a timing when login is done for the first time on the day. The selection of the stage in this case is made in consideration of the following factors.

(Stage Selection Rule 1)

Firstly, if there is a stage that has not been played by the user yet, the stage is automatically selected. If there are a plurality of such stages, the stage having the smallest one of stage ID numbers (internal numbers for managing stages) is selected.

(Stage Selection Rule 2)

Next, if all the stages have been ever played, a stage that has been played a fewer number of times is preferentially selected. If there are a plurality of stages satisfying the same condition, a stage is selected in accordance with the order of the stage ID numbers.

(Stage Selection Rule 3)

In a case other than the cases corresponding to the above two rules, a stage is selected in accordance with the order of the stage ID numbers.

The above selection method is merely an example, and in another exemplary embodiment, another selection method may be used. For example, the user's "record" such as the highest ranking or the largest number of acquired points for each stage may be stored, and a stage with a lower record may be preferentially selected.

Next, a method for automatically selecting a character will be described. Firstly, in the exemplary embodiment, all the characters, i.e., all fifty kinds of characters in this example, are targeted in the character automatic selection for the quick race, irrespective of whether or not the user possesses them. Further, from among all the fifty kinds of characters, a character that can provide, as the above-described combination effect, the maximum effect in the automatically selected stage (in the exemplary embodiment, a character for which the number of items that can be acquired when an item box is touched is increased 3-fold), is selected. In the exemplary embodiment, as the "character that can provide the maximum effect", a character designated for each stage in advance by a game administrator is automatically selected. This provides an occasion of "trying" a character not possessed by the user, thus enhancing a motivation of the user for the game. In addition, since the character that can provide the maximum combination effect is automatically selected, the user's play experience of the quick race can be enriched. That is, this automatic selection method is based on an intention to provide more amusement to the user.

In another exemplary embodiment, as the character for the quick race, a character other than the "character that can provide the maximum effect" may be designated. For example, a character that provides the second highest effect may be designated by a game administrator and automatically selected. In still another exemplary embodiment, a predetermined character may be automatically selected from among all the characters, irrespective of the magnitude of the effect. In this case, control may be performed so as to preferentially select a character that has been used less frequently, for example.

In the exemplary embodiment, the timing at which the character for the quick race is automatically selected is the same as the timing at which the stage is selected (to be exact, after the stage is determined, the character is determined in response to the stage determination result).

Next, a method for automatically selecting a machine will be described. In the exemplary embodiment, unlike the case of the character, a machine is automatically selected from among the machines possessed by the user. At this time, the combination effect is also taken into consideration, and a machine that can provide the maximum combination effect in the automatically selected stage is preferentially selected from among the machines possessed by the user.

Next, a method for automatically selecting an equipment item will be described. In the exemplary embodiment, an equipment item is also selected by the same method as in the case of the machine. That is, an equipment item that can provide the maximum combination effect in the automatically selected stage is preferentially selected from among the equipment items possessed by the user.

Regarding the timings at which the machine and the equipment item are automatically determined, they may be determined along with the timing at which the stage is automatically selected, or at the time when an operation of starting the game is performed on the quick race relevant image.

It is noted that the reason why selection targets for the machine and the equipment are limited to those possessed by the user is mainly based on the standpoint of game balance. That is, if, also for the machine and the equipment item, those that can provide the maximum combination effects are automatically selected from among the machines and the equipment items that are not possessed by the user, an issue arises in that the racing game becomes too easy, for example, and therefore certain limitations are provided for selection of the machine and the equipment item. However, in another exemplary embodiment, also for the machine and the equipment item, all the machines and the equipment items may be targets of automatic selection, irrespective of possession of the user.

As described above, in the exemplary embodiment, a character and the like are automatically selected in consideration of the combination effect, for the quick race. On the other hand, in the case of the normal race, elements manually selected by the user from among the elements possessed by the user are determined as elements to be used in the race, irrespective of the combination effect generation condition. Therefore, for example, in a case where the user possesses both of a character that can provide the maximum combination effect and a character other than such a character for a certain stage, the user can play the racing game using either character. Meanwhile, in a case where the user does not possess a character that can provide the maximum combination effect, the user is to play the racing game using a character that does not generate the combination effect. On the other hand, in the case of the quick race, it is possible to play the race using a character that can provide the maximum combination effect, even if the user does not possess the character.

In addition, for the normal race, setting of the difficulty level of the racing game can be made on the start confirmation screen. In contrast, for the quick race, the difficulty level is automatically set with reference to the play history of the user. In the exemplary embodiment, the difficulty level of the racing game that the user has played last is directly used. This is based on the standpoint that making the user play with the difficulty level of the last play is most likely to make the user enjoy with an appropriate game balance. For example, such a user who has been recently playing normal races with the difficulty level set at the middle level is expected to be approximately at a middle level also in his/her skill. If a quick race at the beginner level or the advanced level is provided to such a user, the race is too easy or too difficult, so that the user cannot enjoy the quick race suitably, and further, this can lead the user to refrain from playing the quick race. Therefore, it is considered that setting the difficulty level of the last play for the quick race is highly likely to make the user enjoy with an appropriate game balance. However, in another exemplary embodiment, the difficulty level that the user has frequently used may be set by referring to the play history of a plurality of racing games, or the difficulty level may be randomly set. Alternatively, the difficulty level that the user does not usually use may be selected.

While the race elements are automatically selected as described above, among these, the automatically selected stage and the "character that can provide the maximum effect", which is designated in advance in association with the stage, are presented to the user on the thumbnail image 133 shown in FIG. 4. The thumbnail image 133 includes a used stage image 136 indicating the automatically selected stage and a used character image 135 indicating the automatically selected character. Thus, the thumbnail image 133 can differ in accordance with the automatically selected contents. Owing to the thumbnail image 133, the user can visually recognize at which stage the quick race can be played and which character can be used for the race. In another exemplary embodiment, in a case where the machine and the equipment item are also automatically selected at the time of the automatic selection of the stage, the automatically selected machine and equipment item may be also displayed on the thumbnail image 133.

As an example of a third input, when the user taps the thumbnail image 133, the quick race is started. The racing game itself is the same as in the process of the normal race described above, except that the automatically selected race elements are used and except for the user. Therefore, when the user has reached the goal of the quick race (finished the whole race), the aforementioned common reward is given to the user in accordance with the race result. However, in a case where the character used in the quick race is a character not possessed by the user, a reward for the character, such as experience points for the character, is not given.

Further, in the quick race, a quick race reward is given to the user, in addition to the common reward. The quick race reward is a reward given to the user irrespective of the race result when the goal of the quick race is reached. The content of the quick race reward is different from the content of the common reward. In the exemplary embodiment, as the quick race reward, the following two types of rewards are prepared: a content determined by a lottery (hereinafter, a lottery content), and a "jewel" which is a second in-game currency different from the coin. Either of these is given to the user in accordance with the number of days on which the user logged in, for example. The content displayed in the reward information area 132 shown in FIG. 4 indicates which of the two types of rewards the quick race reward on "the day" is. In the exemplary embodiment, the case of using two types of rewards as the quick race reward is shown, but in another exemplary embodiment, one type of reward may be used or three or more types of rewards may be used.

As described above, the number of times the quick race can be played is limited to once per day, and therefore, the number of times the quick race reward is given is also up to once per day. Then, when the next unit period starts, the limitation is canceled so that the quick race can be played, and thus the quick race reward on the day can be given.

In the exemplary embodiment, in a case where the quick race reward is the "lottery content", the timing of performing the lottery is after the quick race is finished. However, in another exemplary embodiment, instead of this timing, the lottery may be performed before the quick race is started (at the timing when a start operation is performed), or at the timing when login is done for the first time on the day.

After the quick race is finished and then the race result screen is displayed and the common reward is given to the user, a screen of representation for giving the quick race reward is displayed. In addition, in a case where the quick race reward on the day is the "lottery content", a predetermined representation for the lottery may be displayed. After the quick race reward is given, the screen shifts to the home screen.

The amount of the reward given as the quick race reward may be also determined with the combination effect reflected therein.

[Details of Game Process in the Exemplary Embodiment]

Hereinafter, the game process in the exemplary embodiment will be described in more detail with reference to the drawings.

[Used Data]

Figure 11:
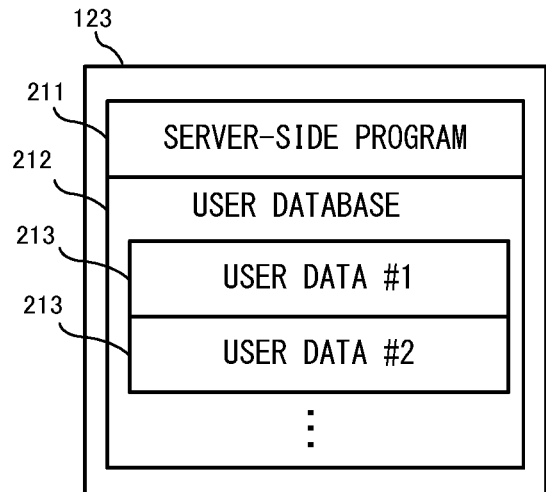
FIG. 11 shows a non-limiting example of a program and data stored in a storage section 123 of the server 101.

First, various data used in this game process will be described. FIG. 11 shows an example of a program and data stored in the storage section 123 of the server 101. The storage section 123 stores a server-side program 211, a user database 212, and the like.

The server-side program 211 is a program for causing the server 101 to execute various functions assigned to the server side in the game process according to the exemplary embodiment.

Figure 12:
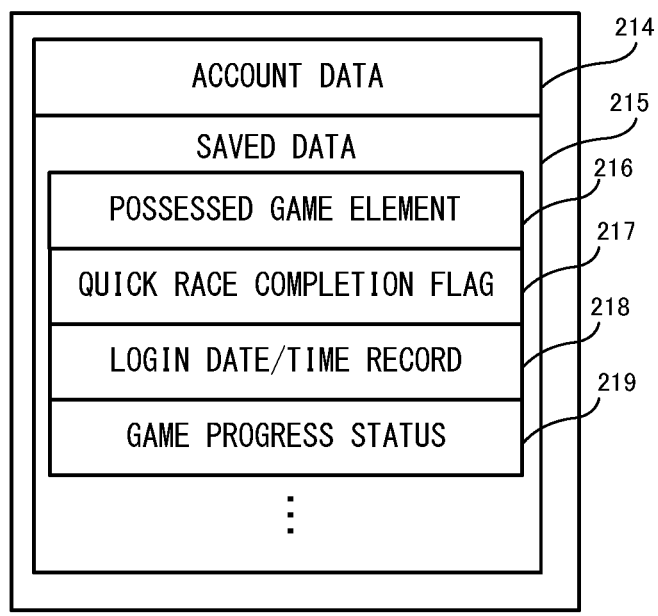
FIG. 12 shows a non-limiting example of the configuration of saved data 215.

The user database 212 is a database in which information about users of the game according to the exemplary embodiment are stored, and includes a plurality of user data 213. FIG. 12 shows an example of the data configuration of the user data 213. The user data 213 includes account data 214, saved data 215, and the like.

The account data 214 is information about the account of each user, and is information for identifying each user. The account data 214 is also used in processing for logging in to the server 101, and the like.

The saved data 215 is saved information about the play status, the progress status, and the like of the game for each user. The saved data 215 includes a possessed game element 216, a quick race completion flag 217, a login date/time record 218, a game progress status 219, and the like.

The possessed game element 216 is information indicating characters, machines, and equipment items possessed by the user.

The quick race completion flag 217 is a flag indicating whether or not the quick race on the day has been already completed (finished by reaching the goal).

The login date/time record 218 is stored data of a record of the dates and times when the user logged in.

The game progress status 219 is data indicating the progress status of the application according to the exemplary embodiment. For example, the game progress status 219 includes data indicating the number of times each stage has been selected and the number of times each of the characters, the machines, the equipment items, and the difficulty levels has been used, and cumulative and statistical data of the race results. In addition, data indicating the possession status of the points, the coins, etc., described above, and the like are also included. Besides, various data indicating the progress status of the application can be stored.

Figure 13:
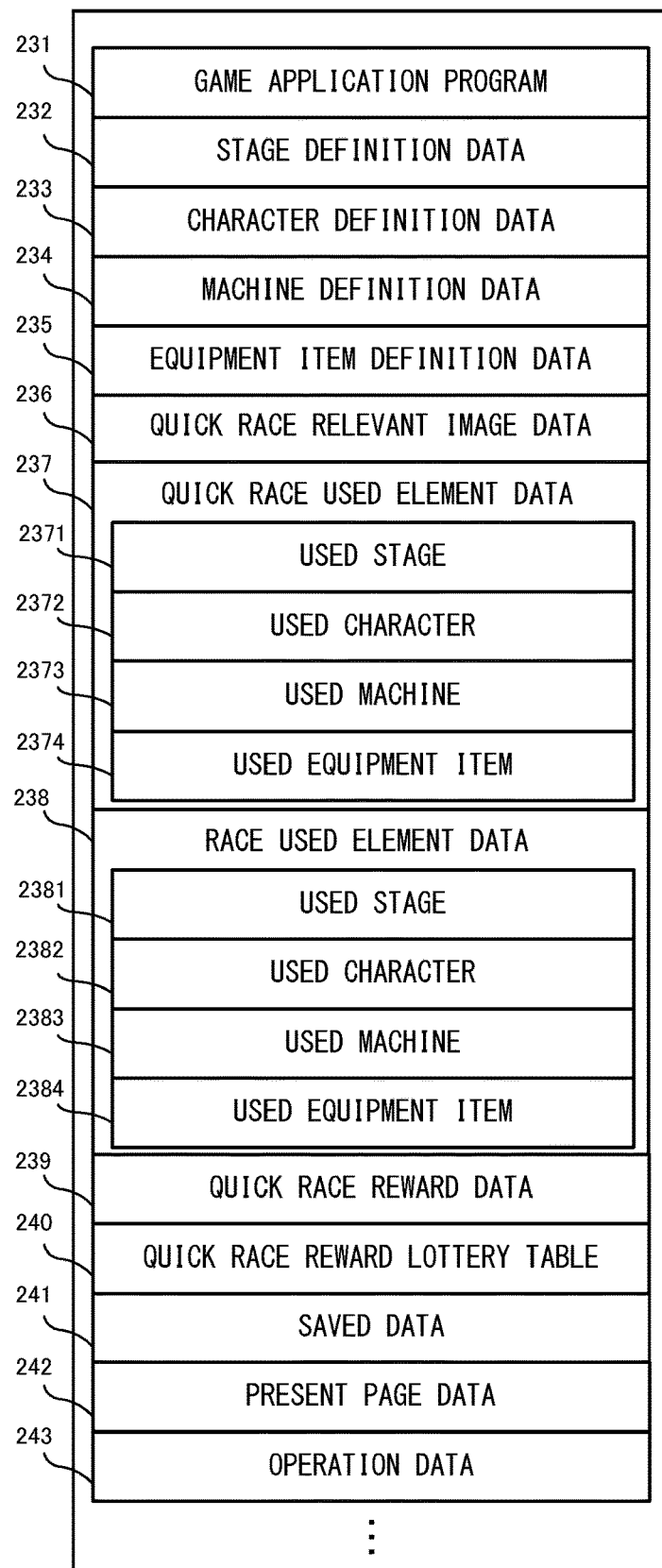
FIG. 13 shows a non-limiting example of a program and data stored in a storage section 113 of the information processing apparatus 102.

Next, data used in the information processing apparatus 102 will be described. FIG. 13 shows an example of a program and data stored in the storage section 113 of the information processing apparatus 102. The storage section 113 stores a game application program 231, stage definition data 232, character definition data 233, machine definition data 234, equipment item definition data 235, quick race relevant image data 236, quick race used element data 237, race used element data 238, quick race reward data 239, a quick race reward lottery table 240, saved data 241, present page data 242, operation data 243, and the like.

The game application program 231 is a program for causing the information processing apparatus 102 to execute a process for the application according to the exemplary embodiment.

The stage definition data 232 is data defining layouts, gimmicks, combination effects, and the like of the stages described above.

The character definition data 233 is data defining the characters described above. The character definition data 233 includes information indicating names, images, performances, and the like of the characters.

The machine definition data 234 is data defining the machines described above. The machine definition data 234 includes information indicating names, images, performances, and the like of the machines. The equipment item definition data 235 is data defining the equipment items described above. The equipment item definition data 235 includes information indicating names, images, performances, and the like of the equipment items.

The quick race relevant image data 236 is image data of the quick race relevant image as shown in FIG. 4.

The quick race used element data 237 is data indicating the race elements to be used in the quick race. The quick race used element data 237 includes a used stage 2371, a used character 2372, a used machine 2373, and a used equipment item 2374 corresponding to the respective race elements. These data are determined by being automatically selected as described above.

The race used element data 238 is data indicating race elements to be used in a racing game. The race used element data 238 includes a used stage 2381, a used character 2382, a used machine 2383, and a used equipment item 2384. In a case of performing the normal race, these data are determined on the basis of a user's selecting operation. In a case of performing the quick race, the contents in the quick race used element data 237 are copied into the race used element data 238 and thus the racing game is executed.

The quick race reward data 239 is data defining the quick race reward. Specifically, the quick race reward data 239 is data defining which of the lottery content and the "jewel" is to be given in accordance with the number of days when the user logged in. In addition, in a case of giving the "jewel", information indicating the basic amount of "jewels" to be given is also included.

The quick race reward lottery table 240 is a lottery table to be used for a lottery in a case where the quick race reward is a lottery content. In the quick race reward lottery table 240, rewards that can be given and the probability of each reward being drawn are defined.

The saved data 241 is data copied from the saved data 215 in the server 101 when the user logged in. In accordance with processing on the information processing apparatus side, the content of the saved data 241 is updated as appropriate, and is transmitted to the server 101 at a predetermined timing, e.g., at a timing of shifting of the screen (as a result, the saved data 215 in the server 101 is updated).

The present page data 242 is data designating the page (see FIG. 6) to be displayed as the home screen.

The operation data 243 is data indicating contents of various operations performed on the operation section 115. In the exemplary embodiment, the operation data 243 includes data indicating whether or not there is an input on the touch panel of the operation section 115, the coordinates of a touched position, and the like, and data indicating the push statuses and the like of buttons (not shown). The content of the operation data 243 is updated at a predetermined cycle on the basis of a signal from the operation section 115.

Other than the above, the storage section 123 also stores various data needed for the game process, as appropriate.

[Details of Game Process]

Next, the details of the game process according to the exemplary embodiment will be described. Here, processes relevant to the quick race and the normal race will be mainly described, and description of the other game processes is omitted.

First, a process in the server 101 will be briefly described. Although not shown, the server 101 receives a user's operation (a request from the information processing apparatus 102), and performs login processing, processing of transmitting and receiving necessary data, and the like as appropriate in accordance with the content of the received operation.

Figure 14:
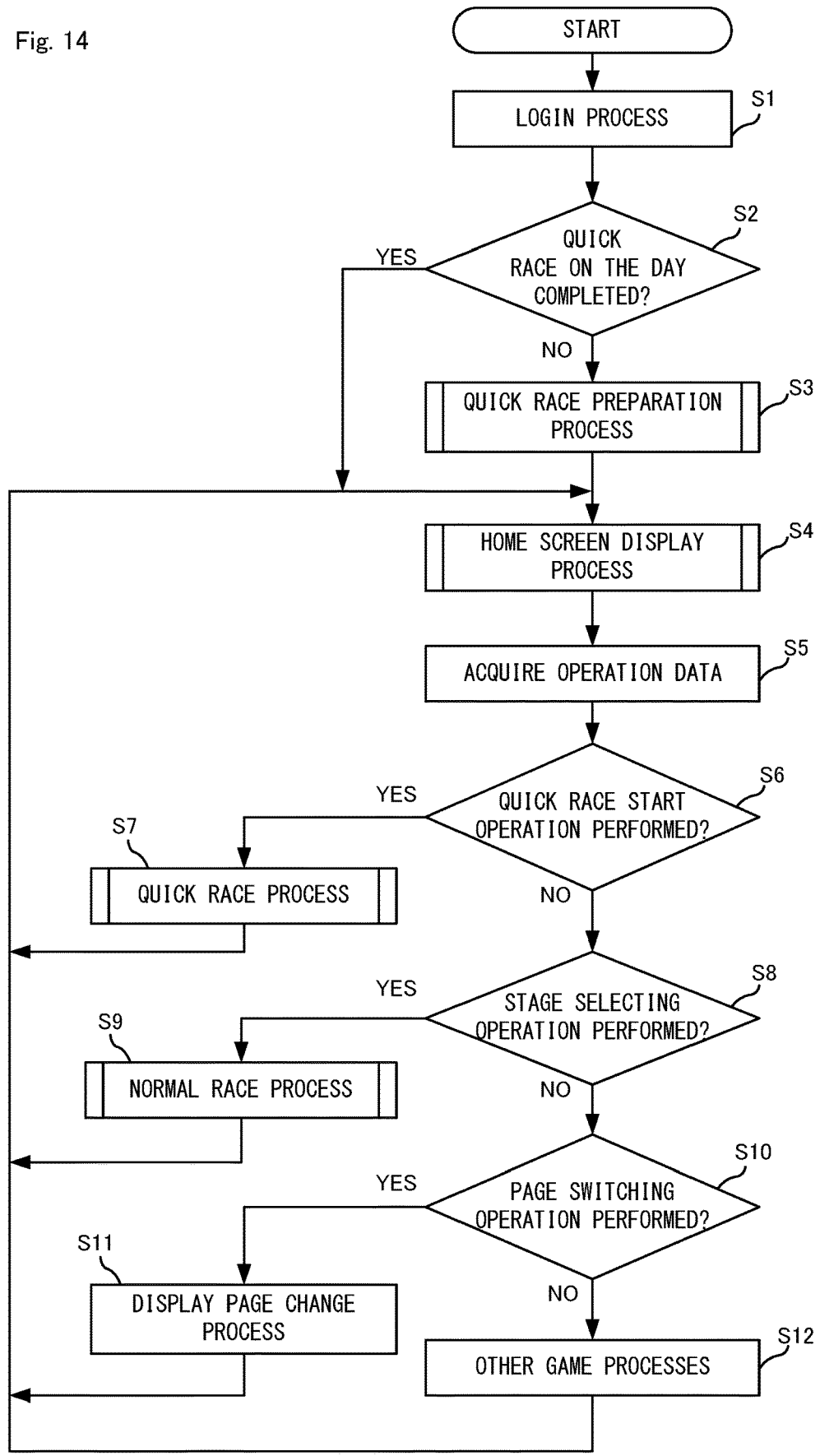
FIG. 14 is a non-limiting example of a flowchart showing the details of a game process according to the exemplary embodiment.

Next, a process executed in the information processing apparatus 102 will be described. FIG. 14 is a flowchart showing the details of an application process executed by the processor 111 of the information processing apparatus 102. On the information processing apparatus 102, the user performs an application start operation, e.g., an operation of tapping an icon of the application on a menu screen, whereby the process of the application according to the exemplary embodiment can be started. When the process is started, first, in step S1, a login process is executed. In this process, the processor 111 performs processing of logging in to the server 101. At this time, the login date and time are also stored in the login date/time record 218. Further, the processor 111 performs processing of copying the saved data 215 stored in the server 101, to the saved data 241 in the storage section 113. In addition, the processor 111 also performs processing of initializing various data to be used in the application process. Specifically, "1" indicating the top page is set for the present page data 242.

Next, in step S2, the processor 111 refers to the quick race completion flag 217 included in the copied saved data 241, to determine whether or not the quick race on the day has been already completed. If the quick race has been completed (YES in step S2), the processor 111 advances the process to step S4 described later. If the quick race has not been completed yet (NO in step S2), the processor 111 executes a quick race preparation process in step S3. This process is a process for automatically selecting race elements to be used in the quick race on the day.

Figure 15:
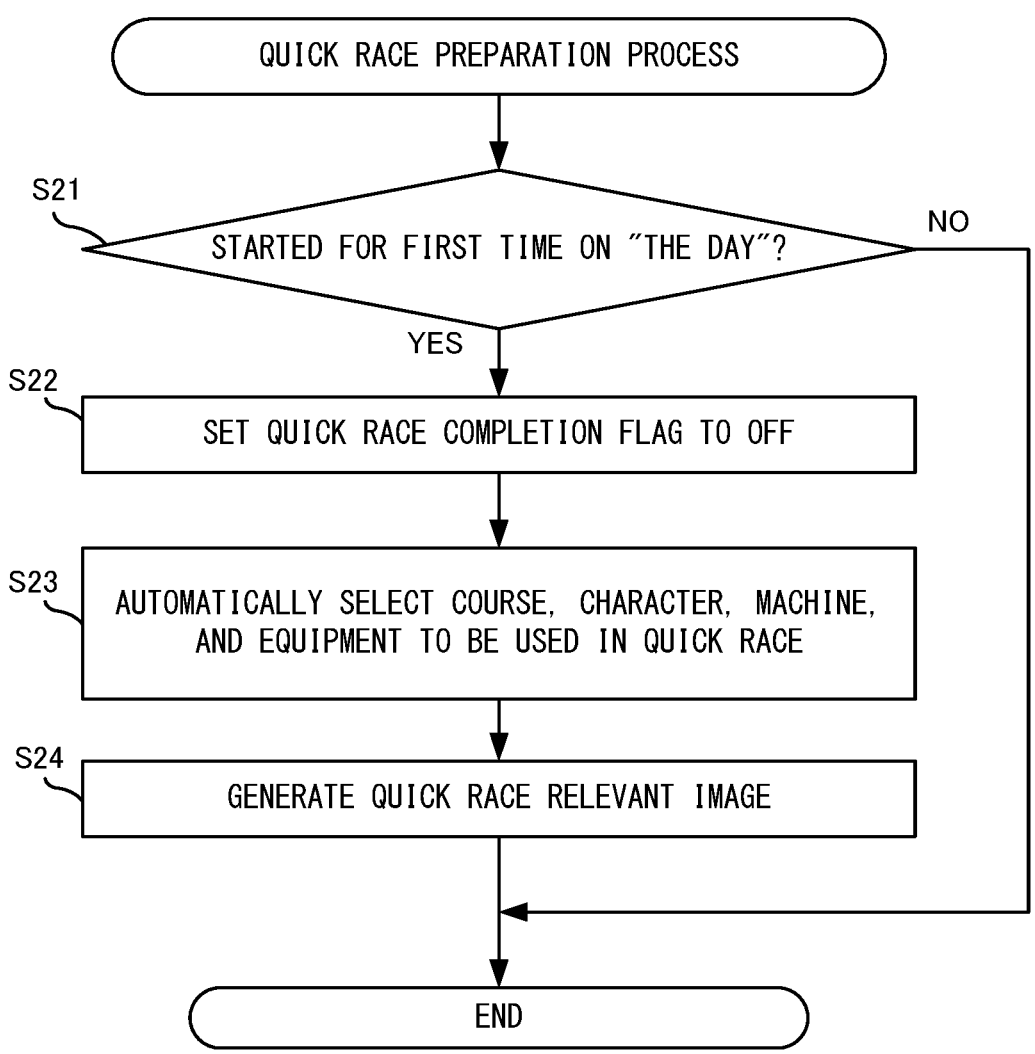
FIG. 15 is a non-limiting example of a flowchart showing the details of a quick race preparation process.

FIG. 15 is a flowchart showing the details of the quick race preparation process. In FIG. 15, first, in step S21, the processor 111 refers to the login date/time record 218, to determine whether or not the login at this time is the first-time login on "the day". That is, the processor 111 determines whether or not the application start operation has been performed for the first time on the day. As a result of the determination, if the login is not the first-time login on the day (NO in step S21), the quick race preparation process is ended.

On the other hand, if the login is the first-time login on the day (YES in step S21), in step S22, the processor 111 sets the quick race completion flag 217 to OFF. Next, in step S23, the processor 111 automatically selects a stage, a character, a machine, and an equipment item to be used in the quick race, by using the selection method as described above. Specifically, first, the processor 111 refers to the game progress status 219, and selects the stage to be used, on the basis of the number of times of play as described above. Next, the processor 111 selects one character that has the maximum combination effect described above for the selected stage, from the character definition data 233, i.e., from among all the characters. Further, the processor 111 selects one machine and one equipment item that can provide the best combination effect, from among the machines and the equipment items stored as the possessed game elements 216, i.e., possessed by the user. Then, the processor 111 stores the selected contents as the used stage 2371, the used character 2372, the used machine 2373, and the used equipment item 2374 included in the quick race used element data 237.

Next, in step S24, the processor 111 generates the quick race relevant image data 236 on which the thumbnail image 133 is displayed, on the basis of the selected stage and character for the quick race, and stores the quick race relevant image data 236 in the storage section 113. Then, the quick race preparation process is ended.

With reference to FIG. 14 again, next, in step S4, the processor 111 executes a home screen display process. This process is a process for displaying the home screen as shown in FIG. 4 and FIG. 5.

Figure 16:
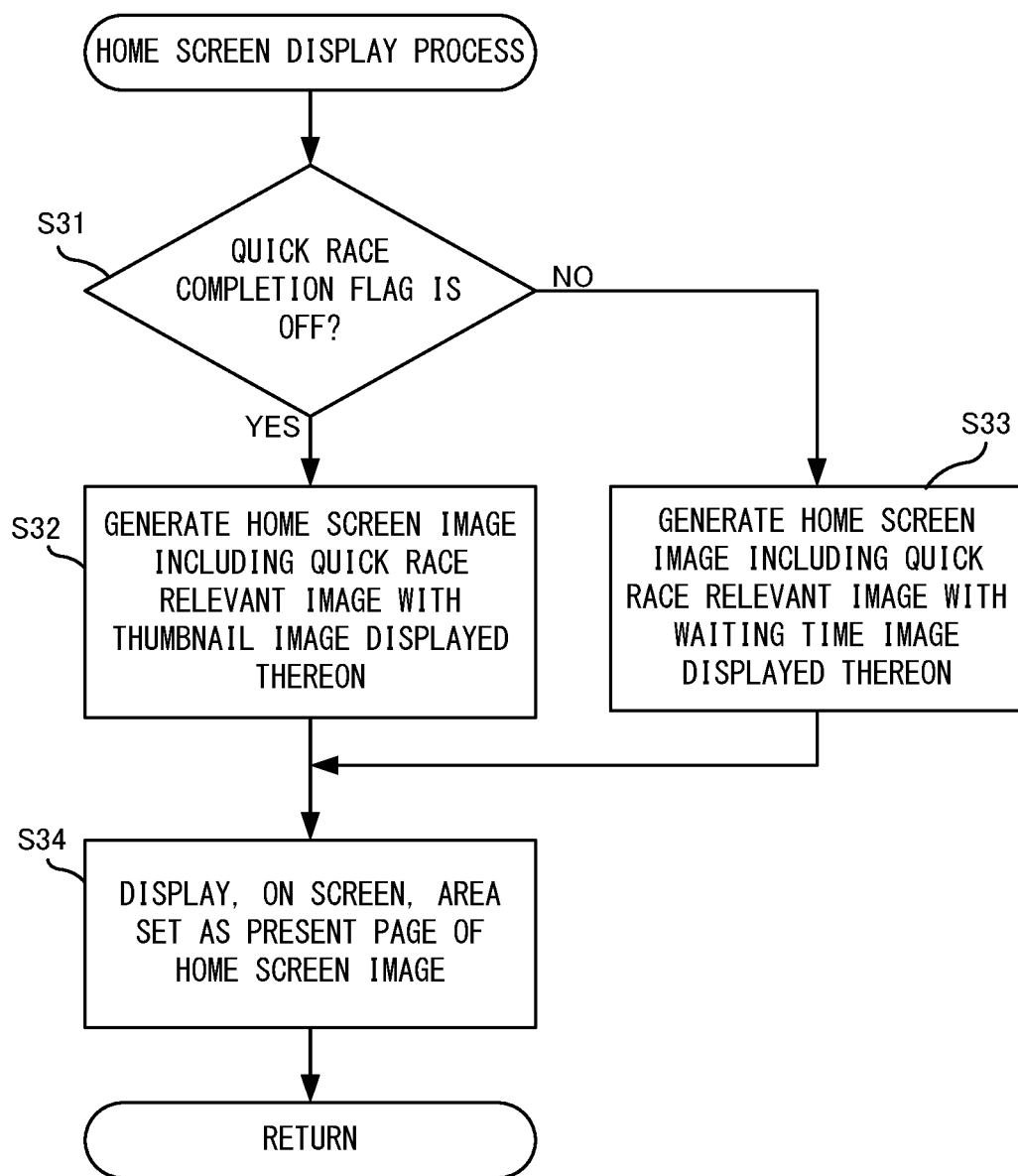
FIG. 16 is a non-limiting example of a flowchart showing the details of a home screen display process.

FIG. 16 is a flowchart showing the details of the home screen display process. In FIG. 16, first, in step S31, the processor 111 determines whether or not the quick race completion flag 217 is OFF. As a result of the determination, if the quick race completion flag 217 is OFF (YES in step S31), it is considered that the quick race on the day has not been completed yet. In this case, in step S32, the processor 111 generates a quick race relevant image on which the thumbnail image 133 is displayed as shown in FIG. 4, on the basis of the quick race relevant image data 236. Then, the processor 111 generates a home screen image in which the generated quick race relevant image is placed on the top page of the home screen. Then, the processor 111 stores image data (not shown) of the home screen image in the storage section 113.

On the other hand, if the quick race completion flag 217 is ON (NO in step S31), it is considered that the quick race on the day has been already finished. In this case, in step S33, the processor 111 generates a quick race relevant image on which the waiting time image is displayed as described above. Then, the processor 111 generates a home screen image in which the generated quick race relevant image is placed on the top page, and stores image data thereof in the storage section 113.

Next, in step S34, the processor 111 displays, on the screen, the area corresponding to the page designated by the present page data 242, of the generated home screen image. Thus, the home screen display process is ended.

With reference to FIG. 14 again, next, in step S5, the processor 111 acquires the operation data 243. In the subsequent step S6, the processor 111 determines whether or not a quick race start operation has been performed, on the basis of the operation data 243. Specifically, the processor 111 determines whether or not the thumbnail image 133 shown in FIG. 4 is tapped. As a result of the determination, if the quick race start operation has been performed (YES in step S6), the processor 111 executes a quick race process in step S7. On the other hand, if the quick race start operation has not been performed (NO in step S6), the process proceeds to step S8 described later. It is noted that, after the quick race on the day has been completed, such a quick race relevant image is never displayed on the day, and therefore the determination result in step S6 never becomes YES.

Figure 17:
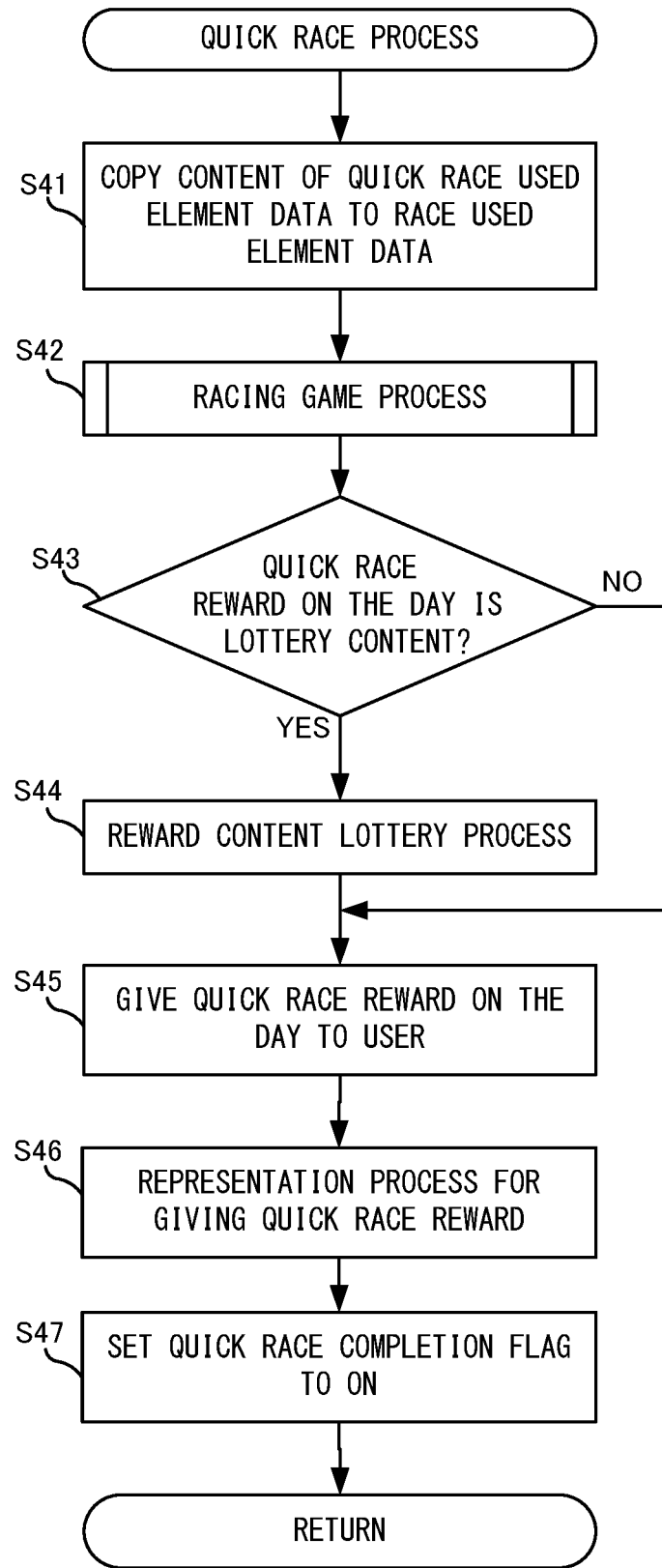
FIG. 17 is a non-limiting example of a flowchart showing the details of a quick race process.

FIG. 17 is a flowchart showing the details of the quick race process in step S7. First, in step S41, the processor 111 copies the content of the quick race used element data 237 to the race used element data 238. Next, in step S42, the processor 111 executes a racing game process. In this case, substantially, a racing game process (i.e., quick race) using the content of the quick race used element data 237 is performed.

Figure 18:
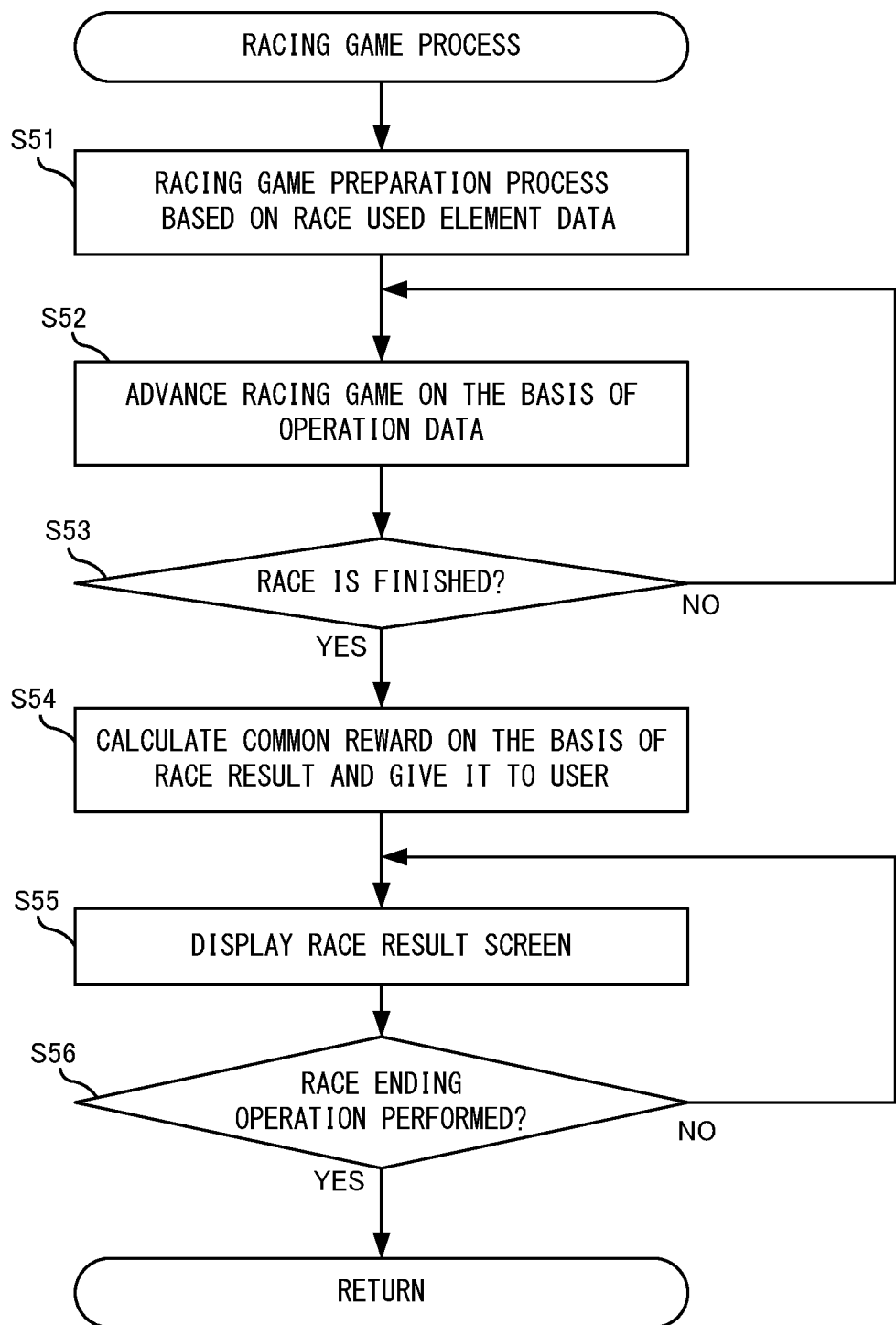
FIG. 18 is a non-limiting example of a flowchart showing the details of a racing game process.

FIG. 18 is a flowchart showing the details of the racing game process. First, in step S51, the processor 111 performs preparation for executing the racing game, on the basis of the race used element data 238. Specifically, the processor 111 generates a stage on which the race takes place in a virtual 3-dimensional space, on the basis of the used stage 2381. Further, the processor 111 generates a user object which is a target to be operated by the user, on the basis of the used character 2382, the used machine 2383, and the used equipment item 2384, and places the user object at a predetermined position in the stage. In addition, the processor 111 performs initial setting for a virtual camera, initialization of various data to be used in the racing game, and the like.

After the process for preparing the racing game is finished, next, in step S52, the processor 111 advances the racing game on the basis of the operation data 243. That is, the processor 111 starts the race and advances the racing game while controlling operation of the user object on the basis of the operation data 243 and controlling operation of other objects.

Next, in step S53, the processor 111 determines whether or not the race is finished. That is, the processor 111 determines whether or not the user object has reached the goal. As a result of the determination, if the race has not been finished (NO in step S53), the process returns to step S52, to continue advancing the racing game. On the other hand, if the user object has reached the goal (YES in step S53), in step S54, the processor 111 calculates the common reward (coins and points) on the basis of the race result and the combination effect. Then, the processor 111 gives the calculated common reward to the user. Thus, the contents of the possessed game element 216 and the game progress status 219 can be updated.

Next, in step S55, the processor 111 generates and displays a race result screen, and waits for a user's operation.

On this screen, the race ranking and the content of the acquired common reward can be displayed.

Next, in step S56, the processor 111 determines whether or not a race ending operation has been performed on the race result screen, on the basis of the operation data 243. If the race ending operation has not been performed (NO in step S56), the process returns to step S55. If the race ending operation has been performed (YES in step S56), the processor 111 ends the racing game process.

With reference to FIG. 17 again, after the racing game process is ended, in step S43, the processor 111 determines whether or not the quick race reward on the day is the lottery content, on the basis of the quick race reward data 239 and the login date/time record 218. As a result of the determination, if the quick race reward on the day is the lottery content (YES in step S43), in step S44, the processor 111 performs a lottery process on the basis of the quick race reward lottery table, to determine the lottery content on the day. As a result, the determined lottery content is used as the quick race reward on the day. On the other hand, if the quick race reward on the day is not the lottery content (NO in step S43), the process in step S44 is skipped.

Next, in step S45, the processor 111 gives the quick race reward on the day to the user. Thus, the contents of the possessed game element 216 and the game progress status 219 can be updated.

Next, in step S46, the processor 111 displays a predetermined representation screen (animation or the like) indicating a scene of giving the quick race reward. For example, in a case where the quick race reward on the day is the lottery content, a representation indicating a flow from a scene of performing the lottery to when the content is determined, is displayed.

Next, in step S47, the processor 111 sets the quick race completion flag 217 to ON. Thus, control is performed so that the quick race cannot be executed during the period of the day. Thus, the quick race process is ended.

With reference to FIG. 14 again, after the quick race process is ended, the process returns to step S4, so as to be repeated.

As a result of the determination in step S6, if the quick race start operation has not been performed, in step S8, the processor 111 determines whether or not a stage selecting operation has been performed, on the basis of the operation data 243. Specifically, the processor 111 determines whether or not a stage selecting operation of selecting a stage from stage options has been performed in a state in which the normal race relevant image is displayed as shown in FIG. 5. As a result of the determination, if a stage selecting operation has been performed (YES in step S8), in step S9, the processor 111 executes a normal race process.

Figure 19:
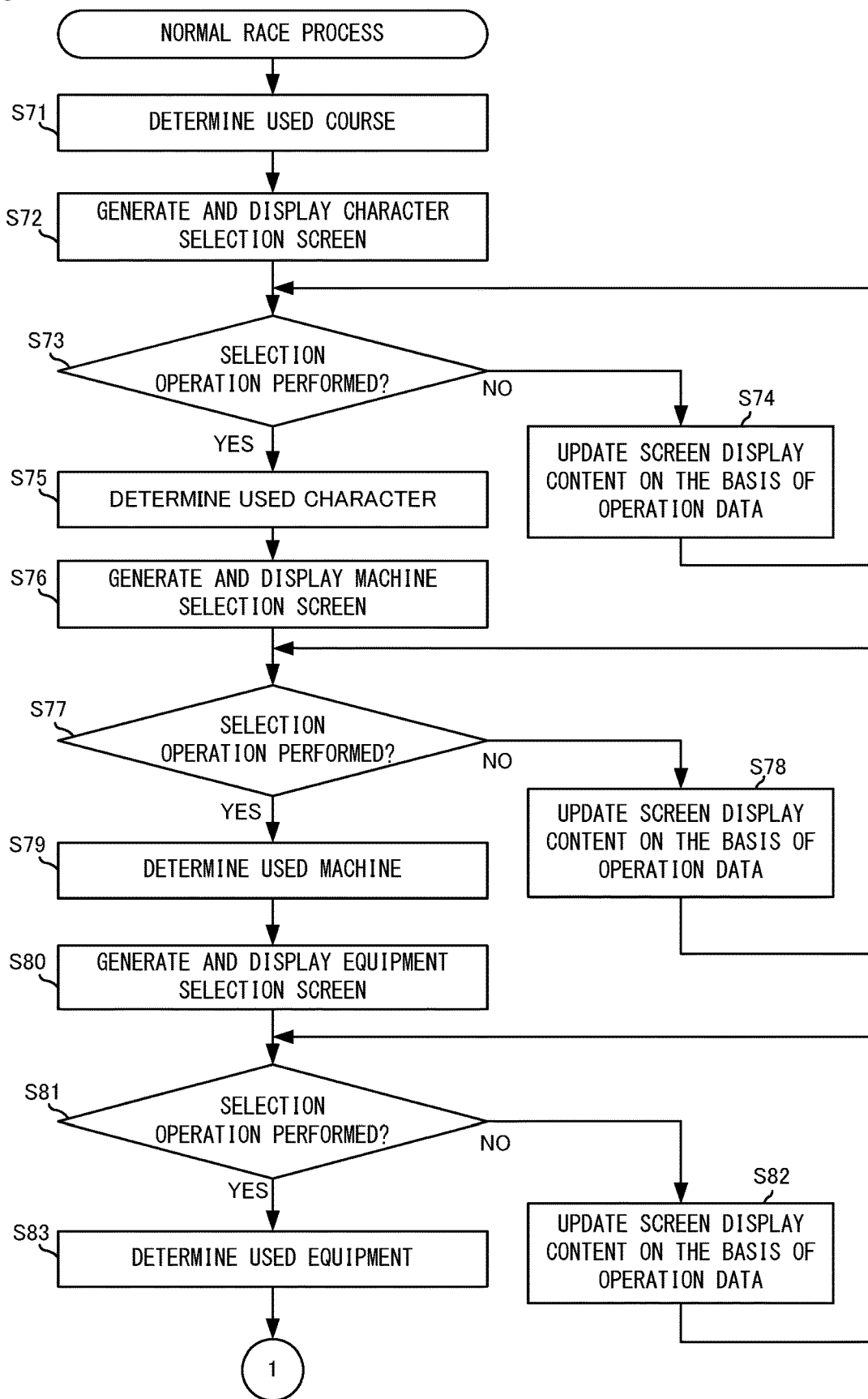
FIG. 19 is a non-limiting example of a flowchart showing the details of a normal race process.
Figure 20:
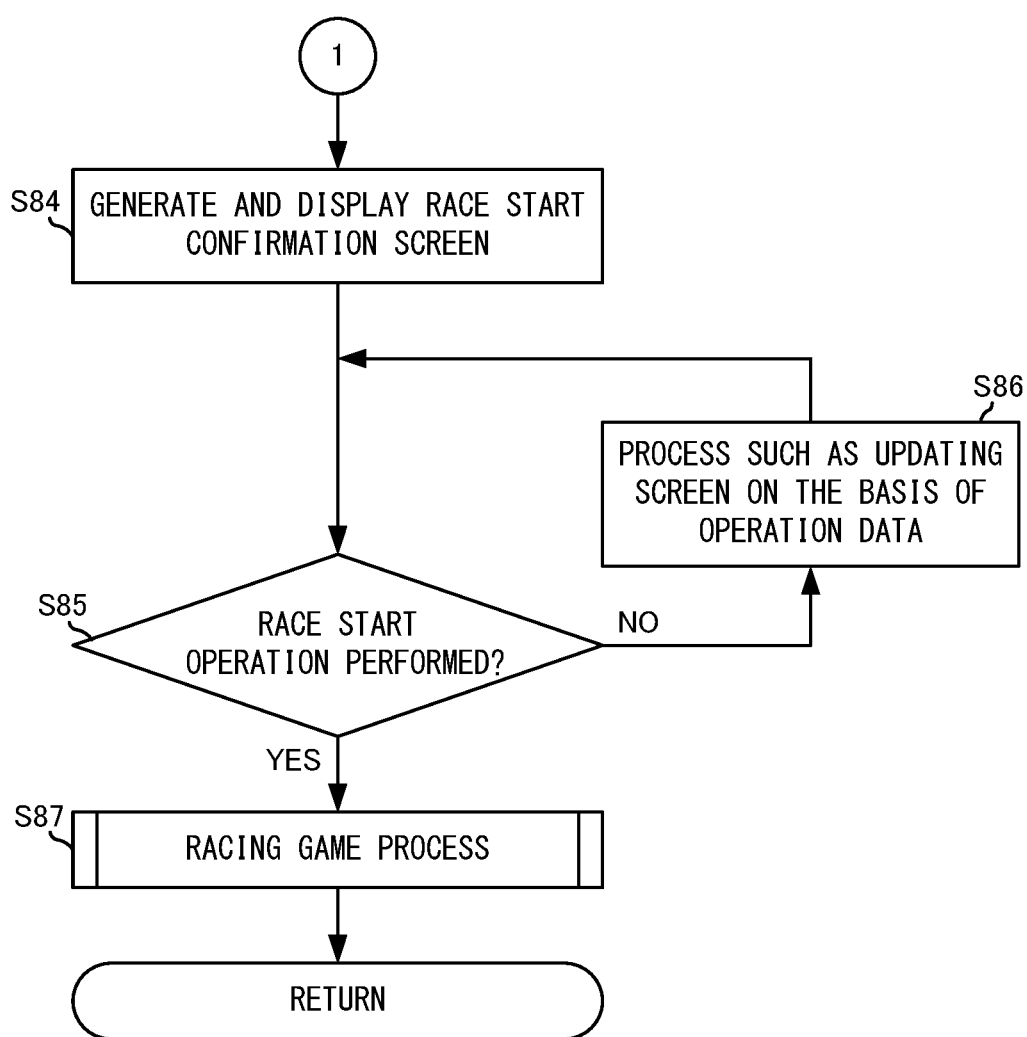
FIG. 20 is a non-limiting example of a flowchart showing the details of the normal race process.

FIG. 19 and FIG. 20 are flowcharts showing the details of the normal race process. In FIG. 19, first, in step S71, the processor 111 sets the used stage 2381 on the basis of the content of the stage selecting operation.

Next, in step S72, the processor 111 generates and displays a character selection screen as shown in FIG. 7. Specifically, the processor 111 extracts characters to be presented as options to the user from the character definition data 233, while sorting them in accordance with the degrees of the combination effects for the selected stage. Further, the processor 111 specifies the characters possessed by the user among the extracted characters, on the basis of the possessed game element 216. Then, the processor 111 makes display setting so as to gray out images of the characters not possessed by the user, and generates and displays a character selection screen as shown in FIG. 7. Then, the processor 111 waits for an operation from the user.

Next, in step S73, the processor 111 determines whether or not a character selecting operation has been performed, on the basis of the operation data 243. If a selecting operation has not been performed (NO in step S73), in step S74, the processor 111 updates the display content of the character selection screen on the basis of the operation data 243, and returns to step S73. For example, if a left/right scrolling operation is performed on the upper area, the middle area, or the lower area in FIG. 7, the processor 111 executes processing of changing the display content in the corresponding area in accordance with the operation.

On the other hand, if a character selecting operation has been performed (YES in step S73), next, in step S75, the processor 111 stores the selected character as the used character 2382 in the storage section 113.

Next, in step S76, the processor 111 generates and displays a machine selection screen as shown in FIG. 8. A process for displaying this screen is the same as that in step S72 except that characters are replaced with machines. Therefore, the detailed description thereof is omitted.

Next, in step S77, the processor 111 determines whether or not a machine selecting operation has been performed, on the basis of the operation data 243. If a machine selecting operation has not been performed (NO in step S77), in step S78, the processor 111 updates the display content of the machine selection screen as appropriate on the basis of the operation data 243, and returns to step S77.

On the other hand, if a machine selecting operation has been performed (YES in step S77), next, in step S79, the processor 111 stores the selected machine as the used machine 2383 in the storage section 113.

Next, in step S80, the processor 111 generates and displays an equipment item selection screen as shown in FIG. 9. A process for displaying this screen is the same as that in step S72 except that characters are replaced with equipment items. Therefore, the detailed description thereof is omitted.

Next, in step S81, the processor 111 determines whether or not an equipment item selecting operation has been performed, on the basis of the operation data 243. If an equipment item selecting operation has not been performed (NO in step S81), in step S82, the processor 111 updates the display content of the equipment item selection screen on the basis of the operation data 243, and returns to step S81.

On the other hand, if an equipment item selecting operation has been performed (YES in step S81), next, in step S83, the processor 111 stores the selected equipment item as the used equipment item 2384 in the storage section 113.

Next, in step S84 in FIG. 20, the processor 111 generates and displays a start confirmation screen for the normal race as shown in FIG. 10. Then, the processor 111 waits for an operation from the user.

Next, in step S85, the processor 111 determines whether or not a normal race start operation has been performed, on the basis of the operation data 243. Specifically, the processor 111 determines whether or not the OK button 155 is tapped. As a result of the determination, if a normal race start operation has not been performed (NO in step S85), the processor 111 executes processing such as updating the screen on the basis of the operation data 243. For example, if the difficulty information button 154 is tapped, the processor 111 performs processing of changing setting of the difficulty level to be used for the racing game on the basis of a user's operation, as appropriate.

On the other hand, if a normal race start operation has been performed (YES in step S85), in step S87, the processor 111 executes a racing game process. This process is the same as the racing game process in step S42, and therefore description thereof is omitted. After the racing game process is finished, the processor 111 ends the normal race process.

With reference to FIG. 14 again, after the normal race process is ended, the process returns to step S4, so as to be repeated.

On the other hand, as a result of the determination in step S8, if a stage selecting operation has not been performed (NO in step S8), in step S10, the processor 111 determines whether or not a display page switching operation for the home screen has been performed, on the basis of the operation data 243. Specifically, the processor 111 determines whether or not an operation of swiping in the left/right direction on the page icon area 134 or an operation of tapping any of the page icons 137 has been performed. As a result of the determination, if a display page switching operation has been performed (YES in step S10), in step S11, the processor 111 changes the content of the present page data 242 on the basis of the operation. For example, in a case where an operation of swiping in the left direction has been performed in a state in which the first page of the home screen is displayed, the content of the present page data 242 is changed from "1" to "2". Then, the process returns to step S4, so as to be repeated.

On the other hand, if a display page switching operation has not been performed (NO in step S10), in step S12, the processor 111 executes a game process other than the above processes as appropriate, on the basis of the content of the operation data 243. Then, the process returns to step S4, so as to be repeated. It is noted that, in step S12, if an operation of ending the application process according to the exemplary embodiment is performed, the processor 111 ends the application process.

Thus, the detailed description of the application process according to the exemplary embodiment has been finished.

As described above, in the exemplary embodiment, in addition to the normal race for which the user manually selects race elements to start the race, the quick race which can be started without a labor of selecting race elements is provided. Thus, after starting the application, the user can play the race immediately, with a fewer number of operations than the number of operations for starting the normal race. In addition, after the application is started, the quick race relevant image is displayed in the scene where the home screen is initially displayed. Thus, it is possible to let the user readily play the racing game with one tapping operation after the application is started. Further, when the quick race is played, the quick race reward which is not given in the normal race can be given to the user. Thus, the quick race reward provides a motivation to play the quick race. In addition, regarding automatic selection of race elements for the quick race, control is performed so as to make the automatic selection in consideration of such a race element combination that makes the user more enjoy the racing game. Thus, it is possible to provide a racing game that can be readily started and is highly likely to make the user enjoy sufficiently.

[Modifications]

In the above exemplary embodiment, the case where the screen initially displayed after the application start operation is performed is the home screen, has been shown as an example. In another exemplary embodiment, after the application start operation is performed, predetermined information to be shown to the user, such as "announcement on game", may be, if any, presented before the home screen is displayed. Also in this case, in the scene where the home screen is initially displayed after the "announcement" indication is deleted, the quick race relevant image is to be displayed (as long as the quick race has not been completed yet on the day). Therefore, it is possible to readily and immediately start the racing game after the application is started. Here, the "announcement" indication is either displayed or not displayed, depending on a period or a timing, whereas the home screen can be said to be a screen that can be always displayed after the application is started. Therefore, the scene where the home screen is initially displayed can be said to be substantially a scene immediately after the application is started.

In the above exemplary embodiment, the example in which the quick race relevant image and an image for the normal race are switched therebetween through a display page switching operation, has been shown. Instead of this, in another exemplary embodiment, in a scene where the first screen that can be operated by the user is displayed after the application is started, an image including two buttons of a "quick race" button and a "normal race" button may be displayed, for example. Then, if the "quick race" button is tapped, the quick race may be started, and if the "normal race" button is tapped, a stage selection screen may be displayed to allow the user to select race elements.

Regarding the automatic selection for the quick race, all of the stage, the character, the machine, and the equipment item are automatically selected in the above example. However, in another exemplary embodiment, only some of them may be automatically selected. For example, while the stage and the character are automatically selected, the machine and the equipment item may be manually selected by the user.

Regarding the timing of automatic selection for the quick race, in the above example, the automatic selection is performed at a time of logging in for the first time during the period of "the day". Without limitation thereto, the process for automatic selection may be executed at another timing. For example, the process for automatic selection as described above may be executed at a timing when the application is started. Alternatively, the automatic selection as described above may be performed at a timing when the thumbnail image 133 on the quick race relevant image is tapped, for example. In this case, control may be performed so that images of a stage and a character are not included in the thumbnail image 133. Still alternatively, control may be performed such that the server 101 performs the process for automatic selection as described above. For example, at the timing when "the day" is switched, the process for automatic selection as described above may be executed in the server 101. Then, the server 101 stores the selection result, and control may be performed such that the server 101 transmits the selection result to the information processing apparatus 102 at a timing when login from the information processing apparatus 102 is done, for example.

In the above exemplary embodiment, the example in which the common reward is given in accordance with a result of the racing game, has been shown. However, in another exemplary embodiment, such a common reward may be omitted. In this case, any reward is not particularly given to the user when the normal race is played, while the quick race reward is given to the user when the quick race is played.

In another exemplary embodiment, the amount of the common reward given when the quick race is played may be further increased, in addition to increase based on the race result and the combination effect as described above. Thus, it is possible to provide the user with a motivation to play the quick race.

Some of the processes in the information processing apparatus 102 described above may be executed in the server 101, and a result thereof may be reflected in the processes in the information processing apparatus 102. For example, the information processing apparatus 102 may mainly perform acquisition of operation data and transmission thereof to the server, and various image and sound processes. Meanwhile, the server 101 may perform a game process on the basis of the operation data, such as moving a user object in a virtual game space or performing various determination processes, for example, and then may transmit a result thereof to the information processing apparatus 102.

In another exemplary embodiment, the game application process as described above may be performed by the information processing apparatus 102 alone. That is, the game application process may be performed in a so-called stand-alone manner.

While the exemplary embodiments have been described above in detail, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A non-transitory computer-readable storage medium having stored therein instructions that, when executed by a processor of an information processing apparatus, cause the information processing apparatus to provide execution comprising:

executing an application including a game;
displaying options including elements usable in the game, when a first input is performed by a user in a scene of the application;
determining an element to be used in the game, from among the elements included in the options, on the basis of an operation input by the user;
executing the game using the element determined on the basis of the operation input by the user, in response to a second input by the user;
automatically determining an element to be used in the game, at a predetermined timing before the game is started;
executing the game using the automatically determined element, when a third input is performed by the user in the scene of the application; and
if the element used in the game is the element determined on the basis of the operation input by the user, giving a first reward to the user after the game is ended, and if the element used in the game is the automatically determined element, giving at least a second reward different from the first reward to the user after the game is ended, wherein
the elements are classified into a plurality of types including at least a first type element and a second type element, and
the instructions further causing the information processing apparatus to provide execution comprising:
displaying an image of the options for each of the plurality of types of the elements;
determining the element to be used in the game, for each of the plurality of types of the elements, on the basis of the operation input by the user; and
in the automatic determination of the element, and in response to the third input that is a single input, automatically determining the element to be used in the game, for each of the plurality of types of the elements.

2. The non-transitory computer-readable storage medium according to claim 1, wherein
the elements include at least one of a stage to be used in the game, a character to be used in the game, an equipment item to be used in the game, or a difficulty level to be used in the game.

3. A non-transitory computer-readable storage medium having stored therein instructions that, when executed by a processor of an information processing apparatus, cause the information processing apparatus to provide execution comprising:

executing an application including a game;
displaying options including elements usable in the game, when a first input is performed by a user in a scene of the application;
determining an element to be used in the game, from among the elements included in the options, on the basis of an operation input by the user;
executing the game using the element determined on the basis of the operation input by the user, in response to a second input by the user;
automatically determining an element to be used in the game, at a predetermined timing before the game is started;
executing the game using the automatically determined element, when a third input is performed by the user in the scene of the application; and
if the element used in the game is the element determined on the basis of the operation input by the user, giving a first reward to the user after the game is ended, and if the element used in the game is the automatically determined element, giving at least a second reward different from the first reward to the user after the game is ended, wherein
the elements are classified into a plurality of types including at least a first type element and a second type element, and
the instructions further causing the information processing apparatus to provide execution comprising:
displaying an image of the options for each type of the elements;
determining the element to be used in the game, for each type of the elements, on the basis of the operation input by the user; and
in the automatic determination of the element, automatically determining the element to be used in the game, for each type of the elements, wherein
in the execution of the game, if the element determined from the first type elements and the element determined from the second type elements satisfy a predetermined combination condition, an effect advantageous to the user is generated during the execution of the game, and
in automatically determining the elements respectively from the first type elements and the second type elements, the respective elements are determined so as to satisfy the predetermined combination condition.

4. The non-transitory computer-readable storage medium according to claim 1, wherein
if the element determined from the first type elements and the element determined from the second type elements satisfy a predetermined combination condition, an effect, that the first reward or the second reward becomes more likely to be obtained than in a case of not satisfying the predetermined combination condition, is generated, and in automatically determining the elements respectively from the first type elements and the second type elements, the respective elements are determined so as to satisfy the predetermined combination condition.

5. The non-transitory computer-readable storage medium according to claim 1, the instructions further causing the information processing apparatus to perform operations comprising:

displaying a user interface (UI) image indicating at least one of the automatically determined elements, in the scene of the application; and automatically determining at least one of the elements to be used in the game, before displaying the UI image.

6. The non-transitory computer-readable storage medium according to claim 1, wherein in the automatic determination of the element, the element for which a number of times of usage is small is preferentially determined as the element to be used in the game.

7. The non-transitory computer-readable storage medium according to claim 1, the instructions further causing the information processing apparatus to perform an operation comprising:

in accordance with satisfaction of a predetermined acquisition condition in the game, giving, to the user, an element corresponding to the satisfied condition among the elements to be used in the game, wherein the displayed options are first options including the element given to the user, the element to be used in the game is determined from among the first options, on the basis of the operation input by the user, and in the automatic determination of the element, the element to be used in the game is determined from among second options which include, in addition to the element given to the user, an element that has not been given to the user yet.

8. A non-transitory computer-readable storage medium having stored therein instructions that, when executed by a processor of an information processing apparatus, cause the information processing apparatus to provide execution comprising:

executing an application including a game;

displaying options including elements usable in the game, when a first input is performed by a user in a scene of the application;

determining an element to be used in the game, from among the elements included in the options, on the basis of an operation input by the user;

executing the game using the element determined on the basis of the operation input by the user, in response to a second input by the user;

automatically determining an element to be used in the game, at a predetermined timing before the game is started;

executing the game using the automatically determined element, when a third input is performed by the user in the scene of the application; and if the element used in the game is the element determined on the basis of the operation input by the user, giving a first reward to the user after the game is ended, and if the element used in the game is the automatically determined element, giving at least a second reward different from the first reward to the user after the game is ended, wherein a number of times the second reward is given in a predetermined period of time is limited.

9. The non-transitory computer-readable storage medium according to claim 1, wherein after the game using the automatically determined element is executed a predetermined number of times in a predetermined period of time, execution of the game using the automatically determined element is restricted.

10. A non-transitory computer-readable storage medium having stored therein instructions that, when executed by a processor of an information processing apparatus, cause the information processing apparatus to provide execution comprising:

executing an application including a game;

displaying options including elements usable in the game, when a first input is performed by a user in a scene of the application;

determining an element to be used in the game, from among the elements included in the options, on the basis of an operation input by the user;

executing the game using the element determined on the basis of the operation input by the user, in response to a second input by the user;

automatically determining an element to be used in the game, at a predetermined timing before the game is started;

executing the game using the automatically determined element, when a third input is performed by the user in the scene of the application; and if the element used in the game is the element determined on the basis of the operation input by the user, giving a first reward to the user after the game is ended, and if the element used in the game is the automatically determined element, giving at least a second reward different from the first reward to the user after the game is ended, wherein after the game using the automatically determined element is executed a predetermined number of times in a predetermined period of time, execution of the game using the automatically determined element is restricted, and the restriction of execution of the game using the automatically determined element is canceled every time the predetermined period of time elapses.

11. The non-transitory computer-readable storage medium according to claim 1, wherein the first reward is given to the user, in both of a case where the element used in the game is the element determined on the basis of the operation input by the user, and a case where the element used in the game is the automatically determined element, and an amount of the first reward is changed in accordance with a result of the game.

12. The non-transitory computer-readable storage medium according to claim 1, wherein a number of times of operations for starting the game from when the game application is started until the game is started by the third input is smaller than a number of times of operations for starting the game from when the game application is started until the game is started by the second input.

13. A processing system, comprising:

a processor; and a memory configured to store computer readable instructions that, when executed by the processor, cause the processing system to:

execute an application including a game;

display options including elements usable in the game, when a first input is performed by a user in a scene of the application;

determine an element to be used in the game, from among the elements included in the options, on the basis of an operation input by the user;

execute the game using the determined element, in response to a second input by the user;

automatically determine an element to be used in the game, at a predetermined timing before the game is started;

execute the game using the automatically determined element, when a third input is performed by the user in the scene of the application; and if the element used in the game is the element determined on the basis of the operation input by the user, give a first reward to the user after the game is ended, and if the element used in the game is the automatically determined element, give at least a second reward different from the first reward to the user after the game is ended, wherein the elements are classified into a plurality of types including at least a first type element and a second type element, and the processing system is further caused to:

display an image of the options for each of the plurality of types of the elements;

determine the element to be used in the game, for each of the plurality of types of the elements, on the basis of the operation input by the user; and in the automatic determination of the element, and in response to the third input that is a single input, automatically determine the element to be used in the game, for each of the plurality of types of the elements.

14. An information processing apparatus, comprising:

an input device configured to accept user input; and processing circuitry operatively coupled to the input device, the processing circuitry including at least a processor and a memory, wherein the processing circuitry is configured to:

execute an application including a game;

display options including elements usable in the game, when a first input is performed by a user in a scene of the application;

determine an element to be used in the game, from among the elements included in the options, on the basis of an operation input by the user;

execute the game using the element determined on the basis of the operation input by the user, in response to a second input by the user;

automatically determine an element to be used in the game, at a predetermined timing before the game is started;

execute the game using the automatically determined element, when a third input is performed by the user in the scene of the application; and if the element used in the game is the element determined on the basis of the operation input by the user, give a first reward to the user after the game is ended, and if the element used in the game is the automatically determined element, give at least a second reward different from the first reward to the user after the game is ended, wherein the elements are classified into a plurality of types including at least a first type element and a second type element, and the processing circuitry is further configured to:

display an image of the options for each of the plurality of types of the elements;

determine the element to be used in the game, for each of the plurality of types of the elements, on the basis of the operation input by the user; and in the automatic determination of the element, and in response to the third input that is a single input, automatically determine the element to be used in the game, for each of the plurality of types of the elements.

15. An information processing method executed by a computer configured to control a processing system, the information processing method comprising:

executing an application including a game;

displaying options including elements usable in the game, when a first input is performed by a user in a scene of the application;

determining an element to be used in the game, from among the elements included in the options, on the basis of an operation input by the user;

executing the game using the determined element to be used in the game, in response to a second input by the user;

automatically determining an element to be used in the game, at a predetermined timing before the game is started;

executing the game using the automatically determined element, when a third input is performed by the user in the scene of the application; and if the element used in the game is the element determined on the basis of the operation input by the user, giving a first reward to the user after the game is ended, and if the element used in the game is the automatically determined element, giving at least a second reward different from the first reward to the user after the game is ended, wherein the elements are classified into a plurality of types including at least a first type element and a second type element, and the information processing method further comprises:

displaying an image of the options for each of the plurality of types of the elements;

determining the element to be used in the game, for each of the plurality of types of the elements, on the basis of the operation input by the user; and in the automatic determination of the element, and in response to the third input that is a single input, automatically determining the element to be used in the game, for each of the plurality of types of the elements.

16. A non-transitory computer-readable storage medium having stored therein instructions that, when executed by a processor of an information processing apparatus, cause the information processing apparatus to provide execution comprising:

executing an application including a game;

displaying options including elements usable in the game, when a first input is performed by a user in a scene of the application;

determining an element to be used in the game, from among the elements included in the options, on the basis of an operation input by the user;

executing the game using the element determined on the basis of the operation input by the user, in response to a second input by the user;

automatically determining an element to be used in the game, at a predetermined timing before the game is started;

executing the game using the automatically determined element, when a third input is performed by the user in the scene of the application; and if the element used in the game is the element determined on the basis of the operation input by the user, giving a first reward to the user after the game is ended, and if the element used in the game is the automatically determined element, giving at least a second reward different from the first reward to the user after the game is ended, wherein the element is automatically determined based on gameplay factors, of the game, associated with the user.

17. A non-transitory computer-readable storage medium having stored therein instructions that, when executed by a processor of an information processing apparatus, cause the information processing apparatus to provide execution comprising:

executing an application including a game;

displaying options including elements usable in the game, when a first input is performed by a user in a scene of the application;

determining an element to be used in the game, from among the elements included in the options, on the basis of an operation input by the user;

executing the game using the element determined on the basis of the operation input by the user, in response to a second input by the user;

automatically determining an element to be used in the game, at a predetermined timing before the game is started;

executing the game using the automatically determined element, when a third input is performed by the user in the scene of the application; and if the element used in the game is the element determined on the basis of the operation input by the user, giving a first reward to the user after the game is ended, and if the element used in the game is the automatically determined element, giving at least a second reward different from the first reward to the user after the game is ended, wherein the element is automatically determined based on history of play of the game associated with the user.

* * * * *